US011425687B2

(12) United States Patent
Park et al.

(10) Patent No.: US 11,425,687 B2
(45) Date of Patent: *Aug. 23, 2022

(54) SINGLE CELL MULTICAST TRAFFIC CHANNEL SCHEDULING IN A WIRELESS NETWORK

(71) Applicant: Ofinno, LLC, Reston, VA (US)

(72) Inventors: Kyungmin Park, Vienna, VA (US); Esmael Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/092,375

(22) Filed: Nov. 9, 2020

(65) Prior Publication Data
US 2021/0168760 A1   Jun. 3, 2021

Related U.S. Application Data

(63) Continuation of application No. 16/825,118, filed on Mar. 20, 2020, now Pat. No. 10,834,702, which is a
(Continued)

(51) Int. Cl.
*H04W 72/12*  (2009.01)
*H04W 76/00*  (2018.01)
(Continued)

(52) U.S. Cl.
CPC .......... *H04W 72/005* (2013.01); *H04W 4/06* (2013.01); *H04W 4/40* (2018.02);
(Continued)

(58) Field of Classification Search
CPC ....... H04W 4/06; H04W 4/70; H04W 72/005; H04W 72/0426; H04W 72/121; H04W 76/28; H04W 76/40; H04W 92/20
See application file for complete search history.

(56) References Cited

U.S. PATENT DOCUMENTS 10,531,384 B2 *  1/2020  Islam ................... H04W 76/28
2016/0044605 A1  2/2016  Vajapeyam et al.
(Continued)

OTHER PUBLICATIONS

3GPP TS 36.300 V14.0.0 (Sep. 2016); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
(Continued)

*Primary Examiner* — Liton Miah
(74) *Attorney, Agent, or Firm* — Jacob L. Mangan; Kavon Nasabzadeh; Willis H. Chang

(57) ABSTRACT

A first base station receives configuration parameters employed by the second base station for at least one broadcast multicast service. The configuration parameters comprise: a first discontinuous reception inactivity timer value; and a first scheduling period start offset. The first base station determines, based on the configuration parameters, a second discontinuous reception inactivity timer value and a second scheduling period start offset. The first base station transmit, to at least one wireless device, first transport blocks for the at least one broadcast multicast service based on the second discontinuous reception inactivity timer value and the second scheduling period start offset.

18 Claims, 18 Drawing Sheets

Related U.S. Application Data continuation of application No. 16/185,439, filed on Nov. 9, 2018, now Pat. No. 10,602,485, which is a continuation of application No. 15/830,487, filed on Dec. 4, 2017, now Pat. No. 10,142,963.

(60) Provisional application No. 62/429,526, filed on Dec. 2, 2016.

(51) Int. Cl.
| | |
|---|---|
| *H04W 72/00* | (2009.01) |
| *H04W 72/04* | (2009.01) |
| *H04W 4/06* | (2009.01) |
| *H04W 76/40* | (2018.01) |
| *H04W 4/40* | (2018.01) |
| *H04W 92/20* | (2009.01) |
| *H04W 4/70* | (2018.01) |
| *H04W 76/28* | (2018.01) |

(52) U.S. Cl.
CPC ..... *H04W 72/0426* (2013.01); *H04W 72/121* (2013.01); *H04W 76/40* (2018.02); *H04W 4/70* (2018.02); *H04W 76/28* (2018.02); *H04W 92/20* (2013.01)

(56) References Cited

U.S. PATENT DOCUMENTS

| | | | |
|---|---|---|---|
| 2016/0366721 | A1 | 12/2016 | Song et al. |
| 2017/0331577 | A1* | 11/2017 | Parkvall ............... H04W 8/18 |
| 2017/0331670 | A1* | 11/2017 | Parkvall ............. H04W 52/028 |
| 2017/0332350 | A1 | 11/2017 | Paredes Cabrera et al. |
| 2017/0367098 | A1 | 12/2017 | Byun et al. |
| 2018/0054807 | A1 | 2/2018 | Lee et al. |
| 2018/0091993 | A1 | 3/2018 | Siomina |
| 2018/0124864 | A1 | 5/2018 | Lee et al. |
| 2018/0199290 | A1* | 7/2018 | Bang .................... H04W 24/08 |

OTHER PUBLICATIONS

3GPP TS 36.423 V14.0.0 (Sep. 2016); Technical Specification; 3rd Generation Partnership Project; Technical Specification Group Radio Access Network; Evolved Universal Terrestrial Radio Access Network (E-UTRAN); X2 application protocol (X2AP) (Release 14).
R2-167409; 3GPP TSG RAN WG2 Meeting #96; Reno, USA, Nov. 14-18, 2016; 3GPP TSG RAN WG1 Meeting #86bis; R1-1610929; Lisboa, Portugal, Oct. 10-14, 2016; Title: LS response on DFN offset.
R2-167481; 3GPP TSG-RAN2 Meeting #96; Reno, USA, Nov. 14-18, 2016; Agenda Item: 8.13.2; Source: OPPO; Title: Discussion on Remain Issues of V2X SPS Enhancements.
R2-167482; 3GPP TSG-RAN2 Meeting #96; Reno, USA, Nov. 14-18, 2016; Agenda Item: 8.13.3; Source: OPPO; Title: Discussion on V2P.
R2-167567; 3GPP TSG-RAN WG2 #96; Reno, USA, Nov. 14-18, 2016; Agenda item: 8.13.2; Source: Samsung, Intel; Title: Handling Sidelink SPS Configurations.
R2-167889; 3GPP TSG-RAN WG2 Meeting #96; Reno, USA, Nov. 14-18, 2016; Agenda item: 8.13.2; Source: Qualcomm Incorporated; Title: SPS enhancement for V2X.
R2-167890; 3GPP TSG-RAN WG2 Meeting #96; Reno, USA, Nov. 14-18, 2016; Agenda item: 8.13.3; Source: Qualcomm Incorporated; Title: Sensing based resource selection for V2P.
R2-167919; 3GPP TSG RAN WG2 #96; Reno, USA, Nov. 14 to 18, 2016; Agenda Item: 8.13.3; Souce: Samsung; Title: Discussion about prioritization of P-UEs.
R2-167928; 3GPP TSG RAN WG2 Meeting #96; Reno, USA, Nov. 14-18, 2016; Agenda Item: 8.13.3; Source: Huawei, HiSilicon; Title: Discussion on P2X Sidelink Communication.
R2-167930; 3GPP TSG RAN WG2 Meeting #96; Reno, USA, Nov. 14-18, 2016; Agenda Item: 8.13.2; Source: Huawei, HiSilicon; Title: Discussions on Remaining Issues for SPS.
R2-167934; 3GPP TSG RAN WG2 Meeting #96; Reno, USA, Nov. 14-18, 2016; Agenda Item: 8.13.1; Source: Huawei, HiSilicon; Title: Multi-PLMN operation for Uu-based V2X.
R2-167998; 3GPP TSG RAN WG2 Meeting #96; Reno, USA, Nov. 14-18, 2016; Agenda item: 8.13.2; Source: Potevio; Title: Details of LCP for enhanced SPS configurations.
R2-167999; 3GPP TSG RAN WG2 Meeting #96; Reno, USA, Nov. 14-18, 2016; Source: Potevio; Title: Discussion on SPS configuration related issues.
R2-168043; 3GPP TSG-RAN WG2 #96; Reno, USA, Nov. 14-18, 2016; Agenda item: 8.13.3; Source: Kyocera; Title: Consideration of the P2V transmission scheme.
R2-168045; 3GPP TSG RAN WG2 #96; Reno, USA, Nov. 14 to 18, 2016; Agenda Item: 8.13.1; Souce: Samsung; Title: Supporting small and variable Service Area in non-overlapped local MBMS service area.
R2-168068; 3GPP TSG-RAN WG2 Meeting #96; Reno, Nevada, USA, Nov. 14-18, 2016; Agenda item: 8.13.3; Source: Samsung; Title: Resource configuration for P2V.
R2-168083; 3GPP TSG RAN WG2 Meeting #96; Reno, USA, Nov. 14-18, 2016; Source: CATT; Title: Discussion on Impact of LCP procedure in V2X SPS resource usage; Agenda Item: 8.13.2.
R2-168084; 3GPP TSG RAN WG2 Meeting #96; Reno, USA, Nov. 14-18, 2016; Source: CATT, ZTE, POTEVIO; Title: Discussion on V2X SPS.
R2-168085; 3GPP TSG-RAN WG2 Meeting #96; Reno, USA, Nov. 14-18, 2016; Source: CATT; Title: Consideration on pool management and resource selection.
R2-168137; 3GPP TSG-RAN WG2 #96; Reno, USA, Nov. 14-18, 2016; Agenda Item: 8.13.2; Source: ZTE; Title: Discussion on SPS related issues.
R2-168139; 3GPP TSG-RAN WG2 Meeting #96; Reno, USA, Nov. 14-18, 2016; Title: MBMS enhancement for Uu based V2X communication; Source: ZTE Corporation.
R2-168144; 3GPP TSG-RAN WG2 Meeting #96; Reno, USA, Nov. 14-18, 2016; Title: Discussion on V2P aspects; Source: ZTE.
R2-168Z73; 3GPP TSG-RAN WG2 Meeting #96; Reno, USA, Nov. 14-18, 2016; Agenda Item: 8.13.3; Source: Coolpad; Title: Discussion on power saving for PC5-based V2P.
R2-168409; 3GPP TSG-RAN WG2 #96; Reno, USA, Aug. 14-18, 2016; Agenda Item: 8.13.2; Source: LG Electronics Inc.; Title: SPS and UE assistant information for V2X.
R2-168410; 3GPP TSG-RAN WG2 #96; Reno, USA, Nov. 14-18, 2016; Agenda Item : 8.13.3; Source: LG Electronics Inc.; Title: Support for V2P service.
R2-168426; 3GPP TSG-RAN WG2 Meeting #96; Reno, USA, Nov. 14-18, 2016; Agenda item: 8.13.3; Source: Nokia, Alcatel-Lucent Shanghai Bell; Title: Efficient V2P/P2V activation.
R2-168427; 3GPP TSG-RAN WG2 Meeting #96; Reno, USA, Nov. 14-18, 2016; Agenda item: 8.13.2; Source: Nokia, Alcatel-Lucent Shanghai Bell; Title: Further discussion on SPS enhancements.
R2-168486; 3GPP TSG-RAN WG2 #96; Reno, Nevada, USA, Nov. 14-18, 2016; Agenda Item: 9.3.1.1.3; Source: Ericsson; Title: Consideration on mobility for URLLC and eV2x.
R2-168642; 3GPP TSG-RAN WG2 #96; Reno, Nevada, USA, Nov. 14-18, 2016; Agenda Item: 8.13.3; Source: Ericsson; Title: Discussion on Sidelink Operations for Pedestrian.
R2-168653; 3GPP TSG-RAN WG2 #96; Reno, Nevada, USA, Nov. 14-18, 2016; Agenda Item: 8.13.2; Source: Ericsson; Title: SPS Protocol for Uu.
R2-168701; 3GPP TSG-RAN WG2 #96; Reno, Nevada, USA, Nov. 14-18, 2016; Agenda Item: 8.13.2; Source: Ericsson, Interdigital, Qualcomm; Title: Configuration of UE Assistance Information.
R2-168702; 3GPP TSG-RAN WG2 #96; Reno, Nevada, USA, Nov. 14-18, 2016; Agenda Item: 8.13.2; Source: Ericsson, Interdigital, ITL; Title: Sidelink SPS Configuration.
R2-168789; 3GPP TSG RAN WG2 Meeting #96; Reno, NV, USA, Nov. 14-18, 2016; Title: Draft LS reply on Voice and Video enhancement for LTE.

* cited by examiner

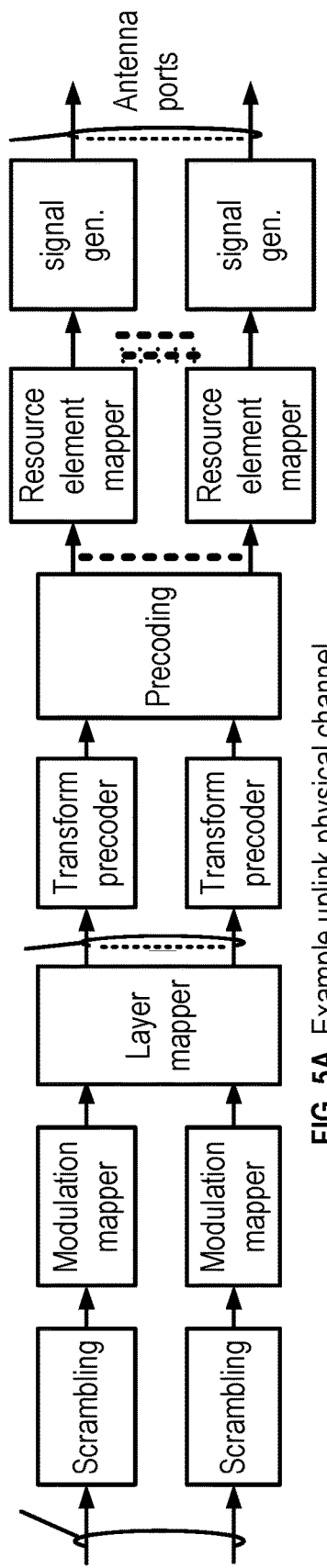
FIG. 5A Example uplink physical channel
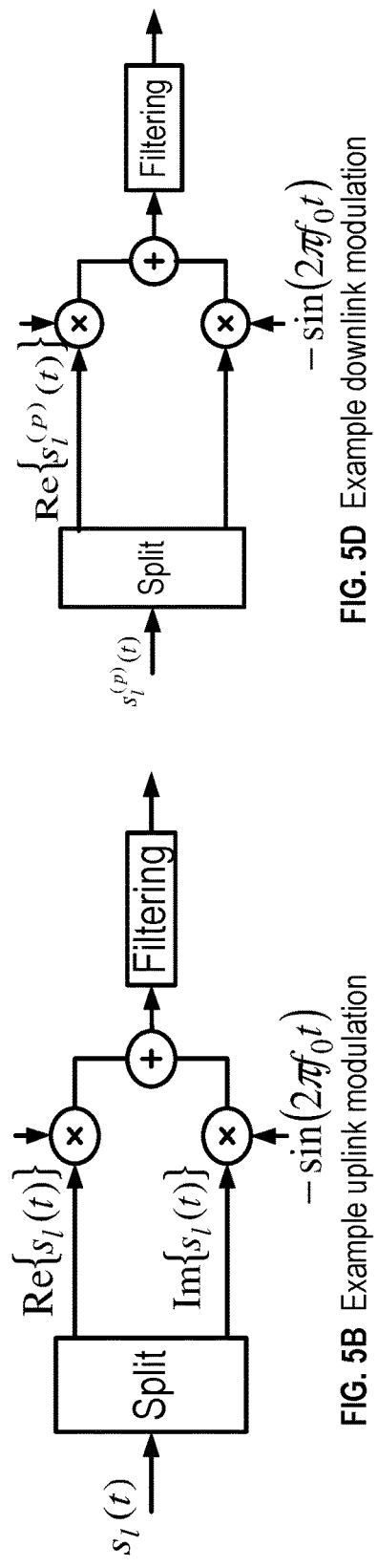
FIG. 5B Example uplink modulation
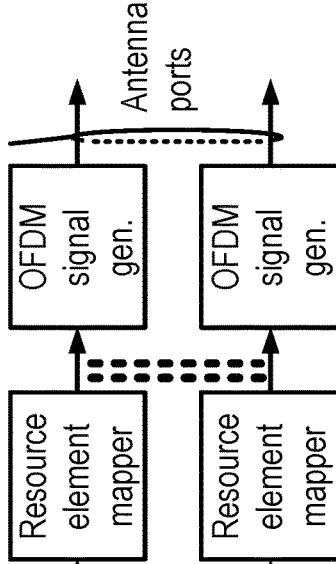
FIG. 5D Example downlink modulation
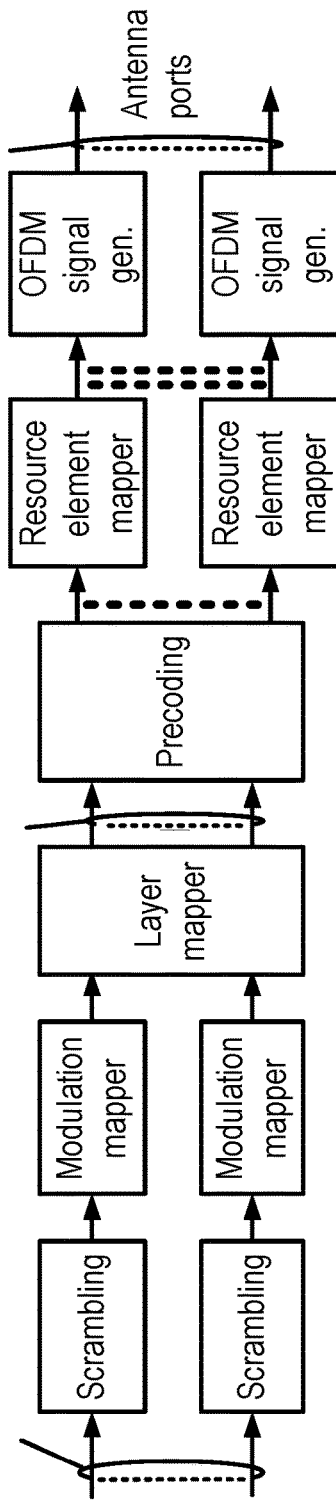
FIG. 5C Example downlink physical channel Dual-Connectivity at eNB Dual-Connectivity- two MAC entities at UE side

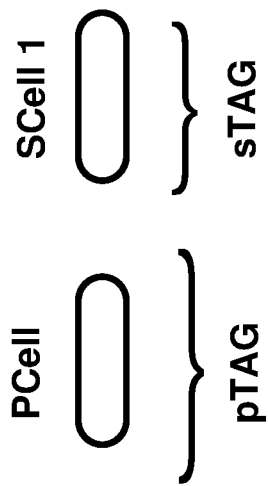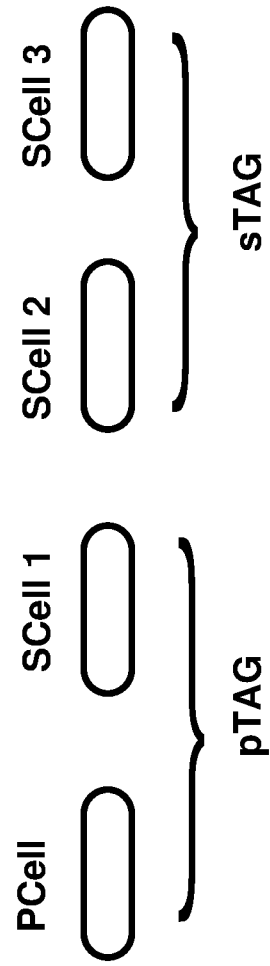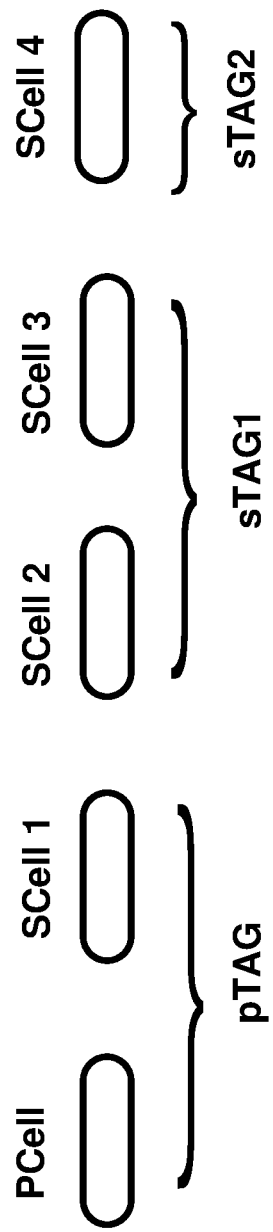
FIG. 8

```
┌─────────────────────────────────────────────────────────┐
│  Receive, by a 1st base station from a 2nd base station, an eNB │
│  configuration update message comprising MBMS configuration │
│  parameter(s) employed by a 1st cell of the 2nd base station, │
│      wherein the MBMS configuration parameter(s) comprise:  │
│      TMGI(s) of MBMS service(s); a 1st discontinuous reception │
│      inactivity timer; and a 1st scheduling period start offset │
│                             1710                             │
└─────────────────────────────────────────────────────────┘
                              │
                              ▼
┌─────────────────────────────────────────────────────────┐
│   Determining, by the 1st base station, a 2nd discontinuous │
│ reception inactivity timer and a 2nd scheduling period start offset │
│ for the MBMS service(s) of the TMGI(s), wherein the determining is │
│  based on the 1st discontinuous reception inactivity timer and the │
│              1st scheduling period start offset              │
│                             1720                             │
└─────────────────────────────────────────────────────────┘
                              │
                              ▼
┌─────────────────────────────────────────────────────────┐
│  Transmit, by the 1st base station to wireless device(s), the 2nd │
│   discontinuous reception inactivity timer and the 2nd scheduling │
│                     period start offset                      │
│                             1730                             │
└─────────────────────────────────────────────────────────┘
                              │
                              ▼
┌─────────────────────────────────────────────────────────┐
│ Transmit, by the 1st base station to the wireless device(s), MBMS │
│    transport blocks for the MBMS service(s) based on the 2nd │
│   discontinuous reception inactivity timer and the 2nd scheduling │
│                     period start offset                      │
│                             1740                             │
└─────────────────────────────────────────────────────────┘
```

FIG. 17

Transmit, by a 1st base station from a 2nd base station, an eNB configuration update message comprising MBMS configuration parameter(s) employed by a 1st cell of the 1st base station, wherein the MBMS configuration parameter(s) comprise: TMGI(s) of MBMS service(s); a 1st discontinuous reception inactivity timer; and a 1st scheduling period start offset
1810

Receive, by the 1st base station from the 2nd base station in response to the eNB configuration update message, an eNB configuration update acknowledge message indicating an acknowledgement of an MBMS configuration update based on the MBMS configuration parameter(s)
1820

Transmit, by the 1st base station to wireless device(s), the 1st discontinuous reception inactivity timer and the 1st scheduling period start offset
1830

Transmit, by the 1st base station to the wireless device(s), MBMS transport blocks for the MBMS service(s) based on the 1st discontinuous reception inactivity timer and the 1st scheduling period start offset
1840

FIG. 18

SINGLE CELL MULTICAST TRAFFIC CHANNEL SCHEDULING IN A WIRELESS NETWORK

CROSS-REFERENCE TO RELATED APPLICATIONS

This application is a continuation of U.S. patent application Ser. No. 16/825,118 filed on Mar. 20, 2020 which is a continuation of U.S. patent application Ser. No. 16/185,439, filed Nov. 9, 2018, (now U.S. Pat. No. 10,602,485 issued on Mar. 24, 2020), which is a continuation of U.S. patent application Ser. No. 15/830,487, filed Dec. 4, 2017, (now U.S. Pat. No. 10,142,963, issued Nov. 27, 2018), which claims the benefit of U.S. Provisional Application No. 62/429,526, filed Dec. 2, 2016, which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 17 is an example flow diagram of an aspect of an embodiment of the present disclosure.

FIG. 18 is an example flow diagram of an aspect of an embodiment of the present disclosure.

DETAILED DESCRIPTION OF EMBODIMENTS

Figure 1:
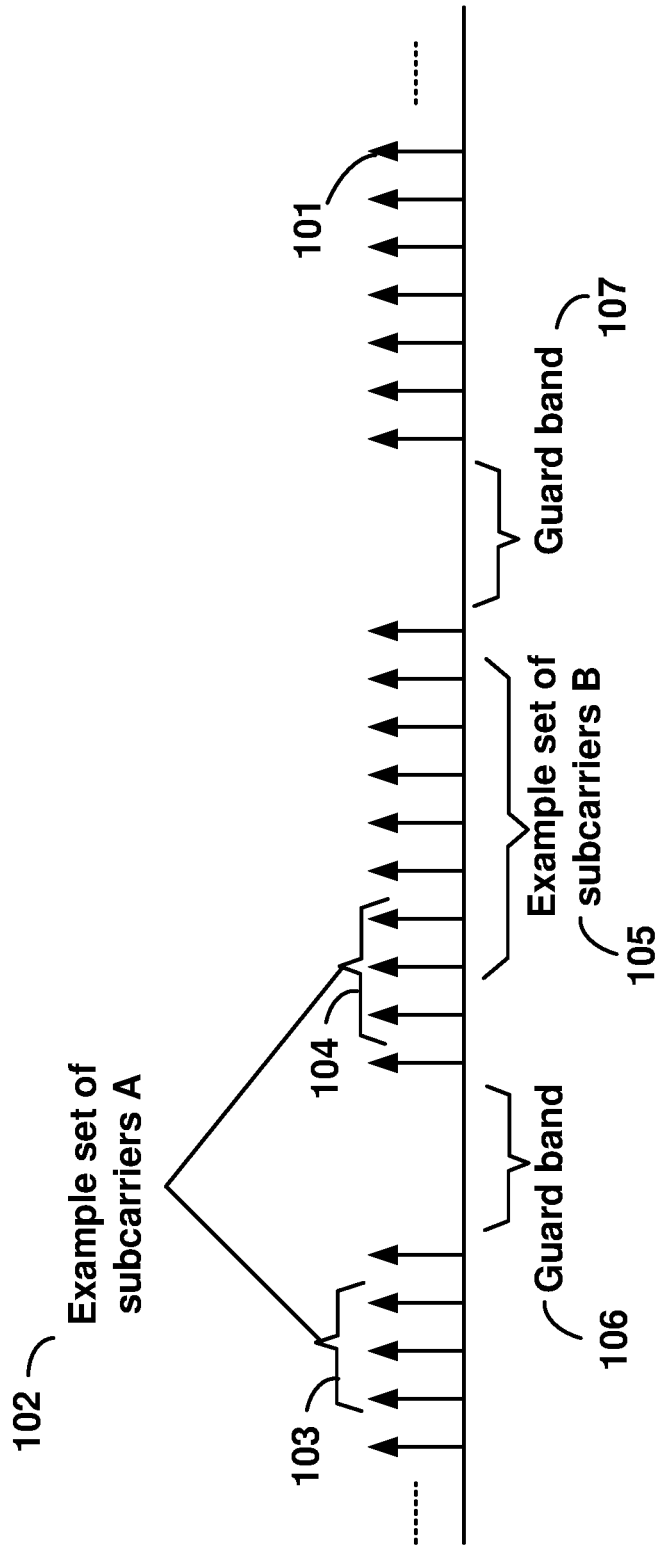
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
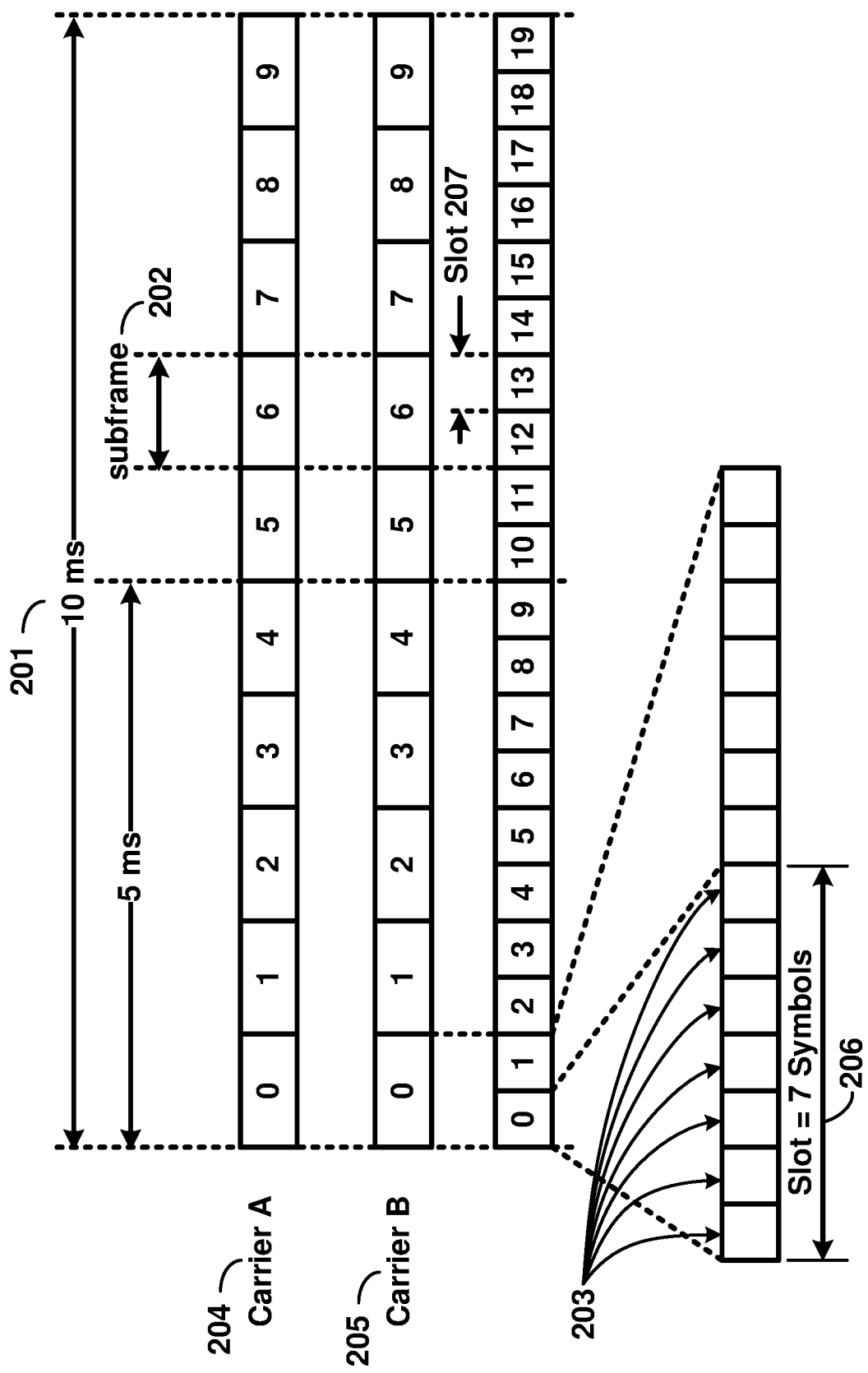
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
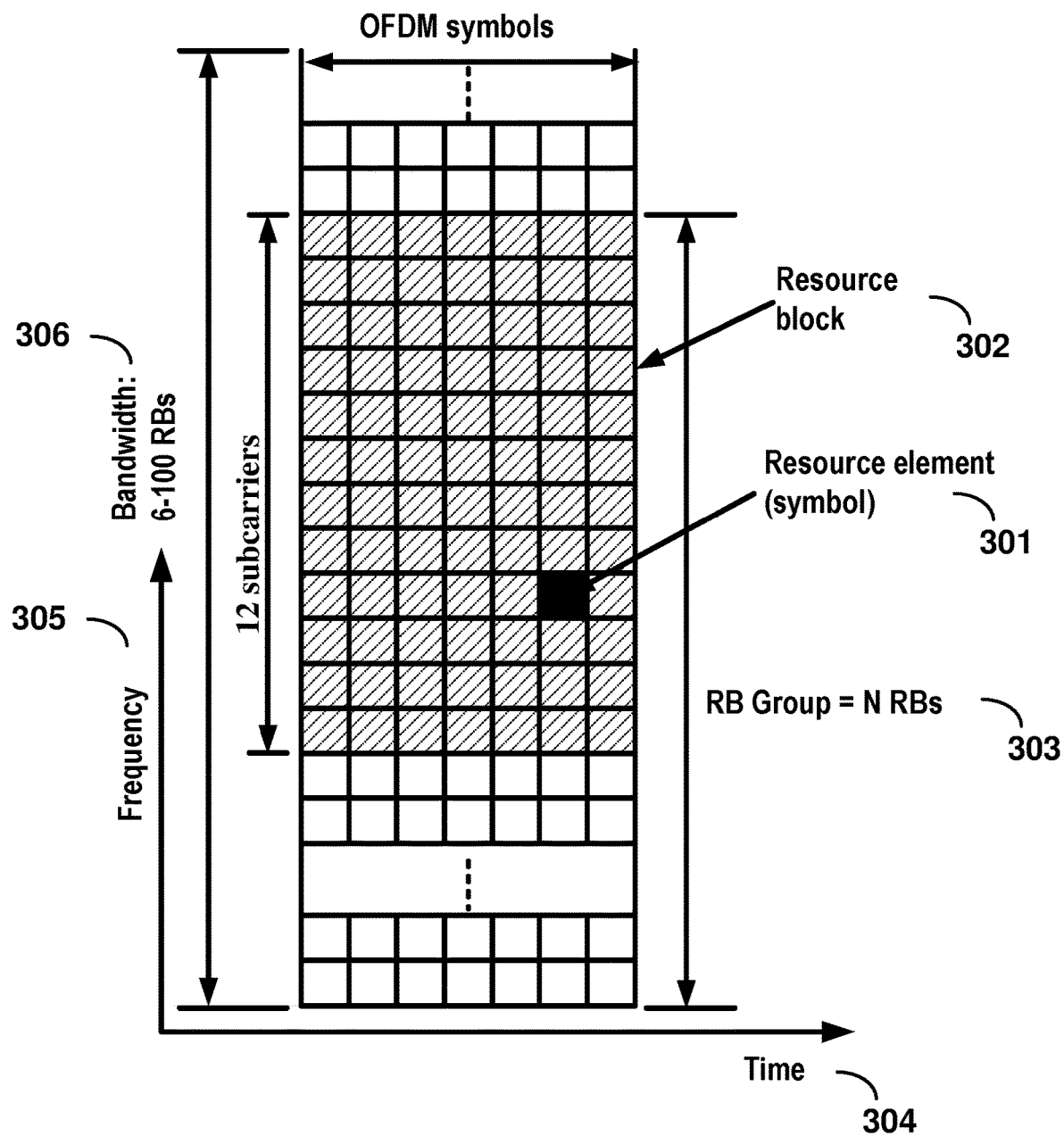
FIG. 3 is a diagram depicting OFDM radio resources as per an aspect of an embodiment of the present disclosure.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
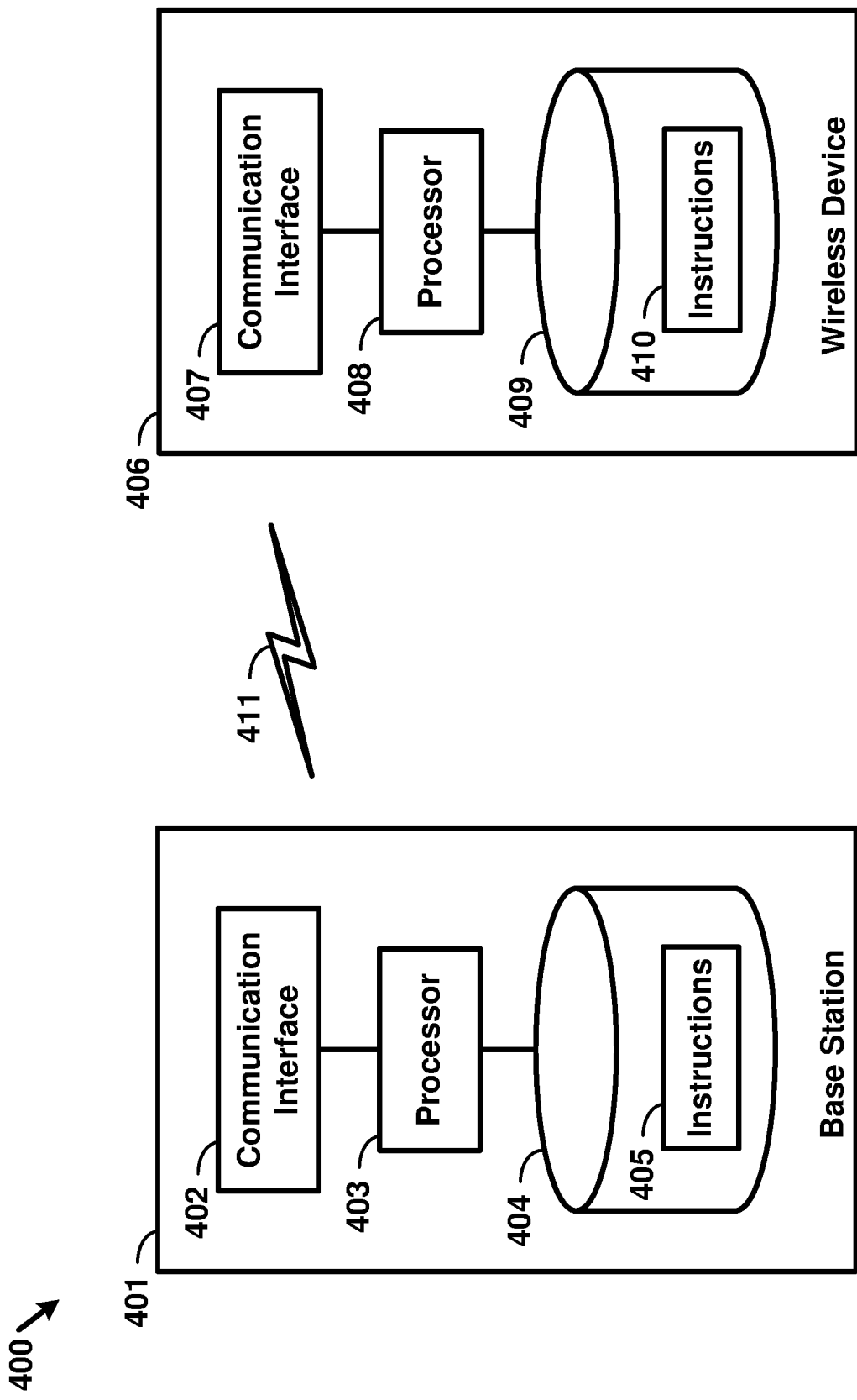
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
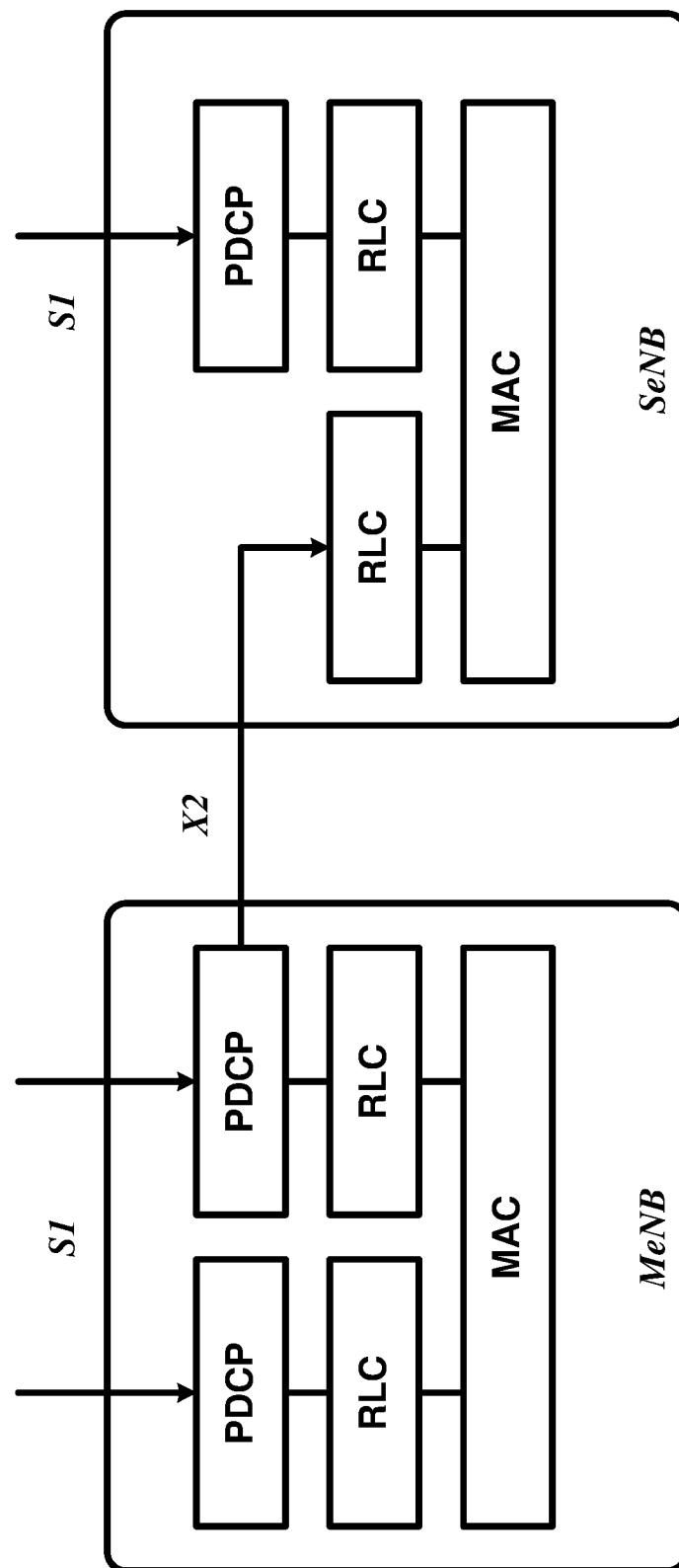
FIG. 6 is an example diagram for a protocol structure with CA and DC as per an aspect of an embodiment of the present disclosure.
Figure 7:
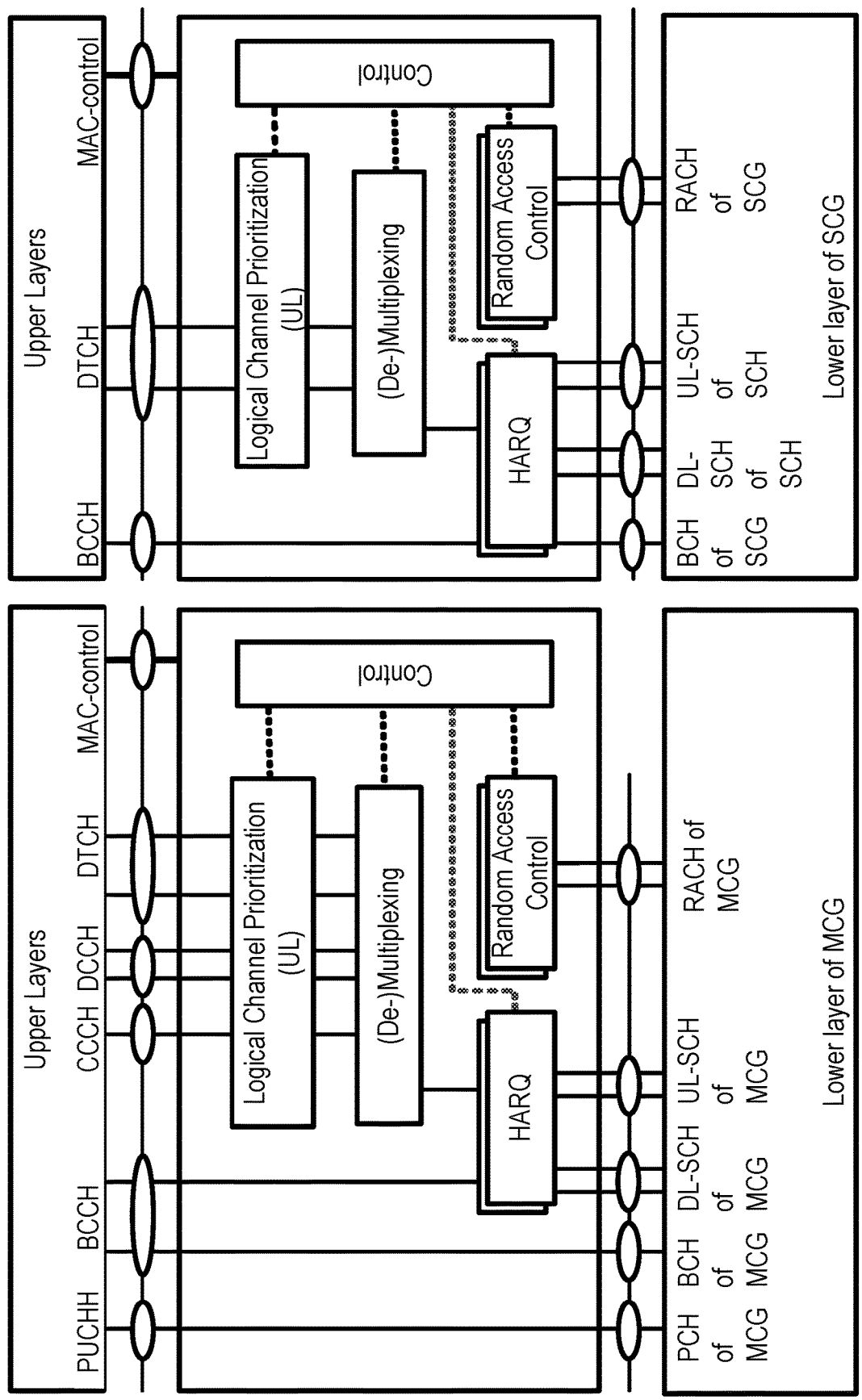
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g, based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
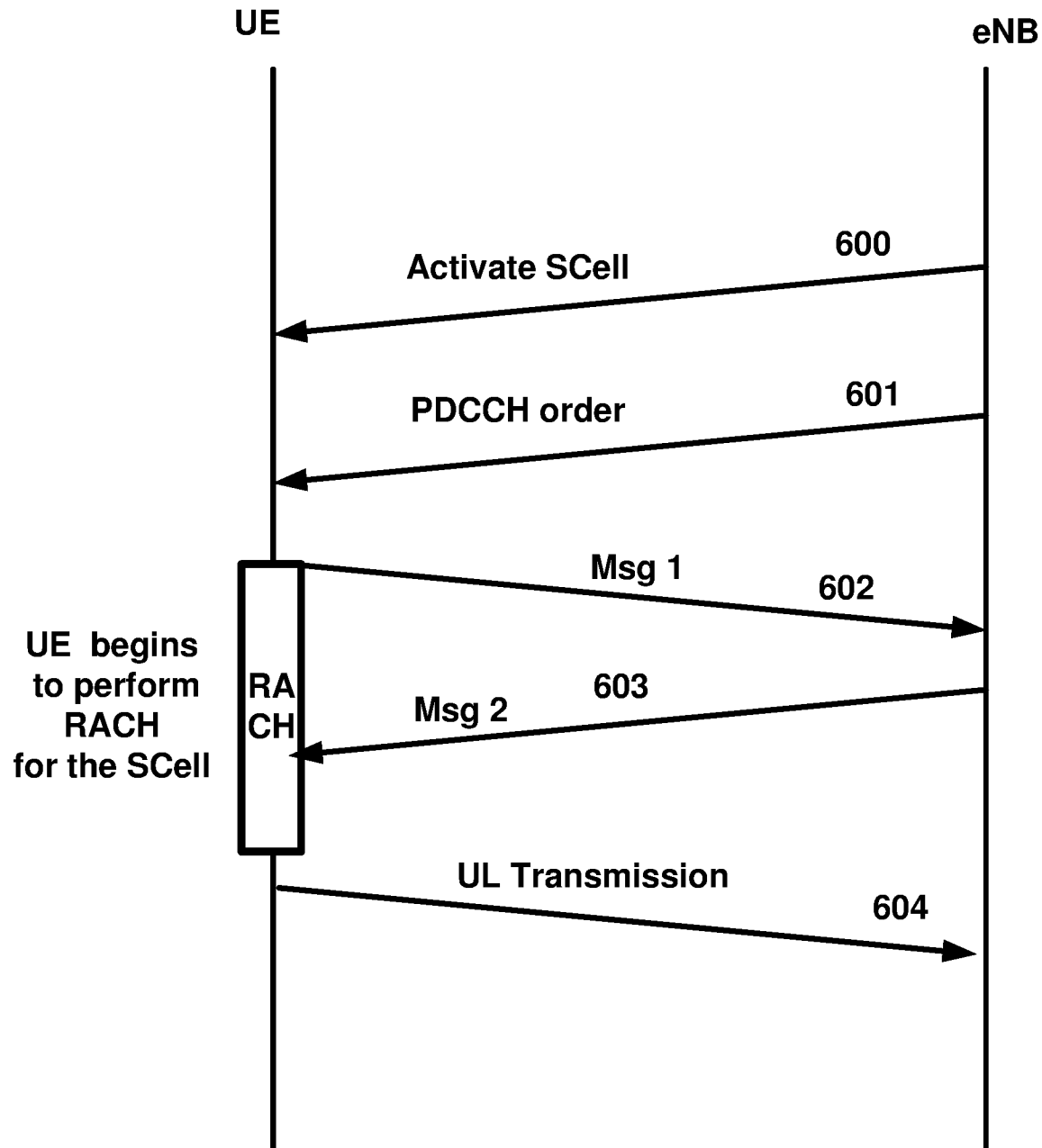
FIG. 9 is an example message flow in a random access process in a secondary TAG as per an aspect of an embodiment of the present disclosure.
Figure 10:
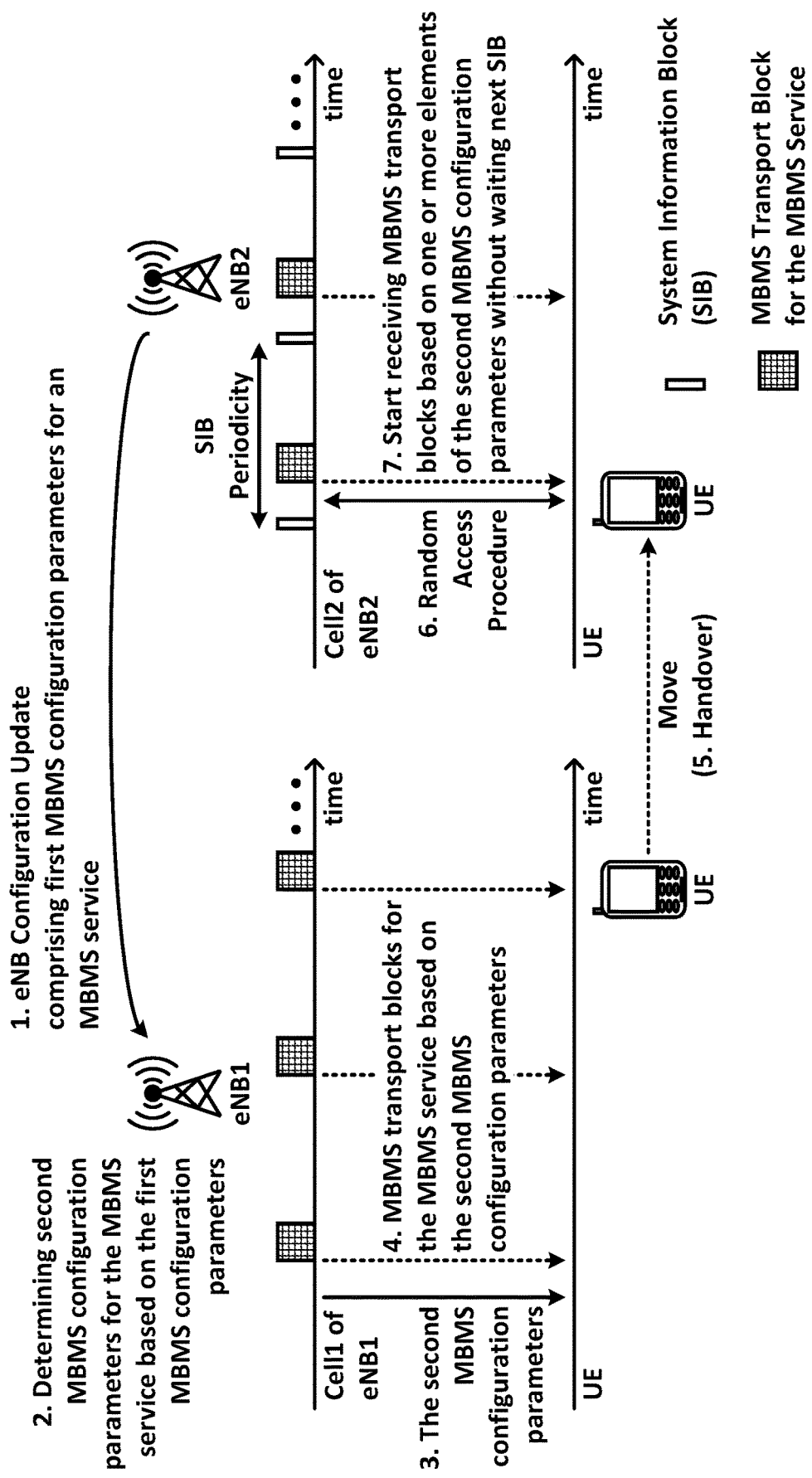
FIG. 10 is an example illustration of an aspect of an embodiment of the present disclosure.
Figure 11:
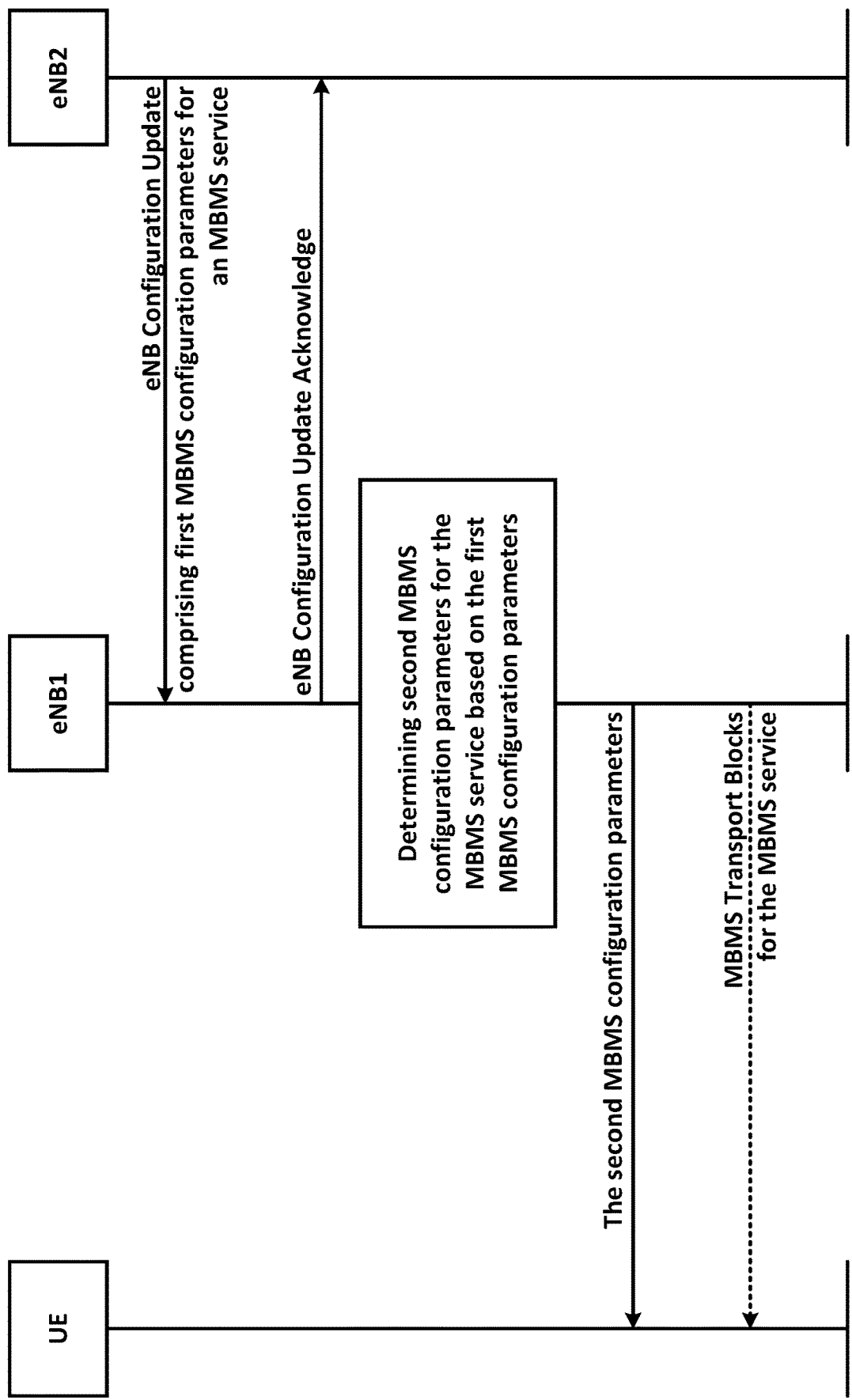
FIG. 11 is an example data flow diagram of an aspect of an embodiment of the present disclosure.
Figure 12:
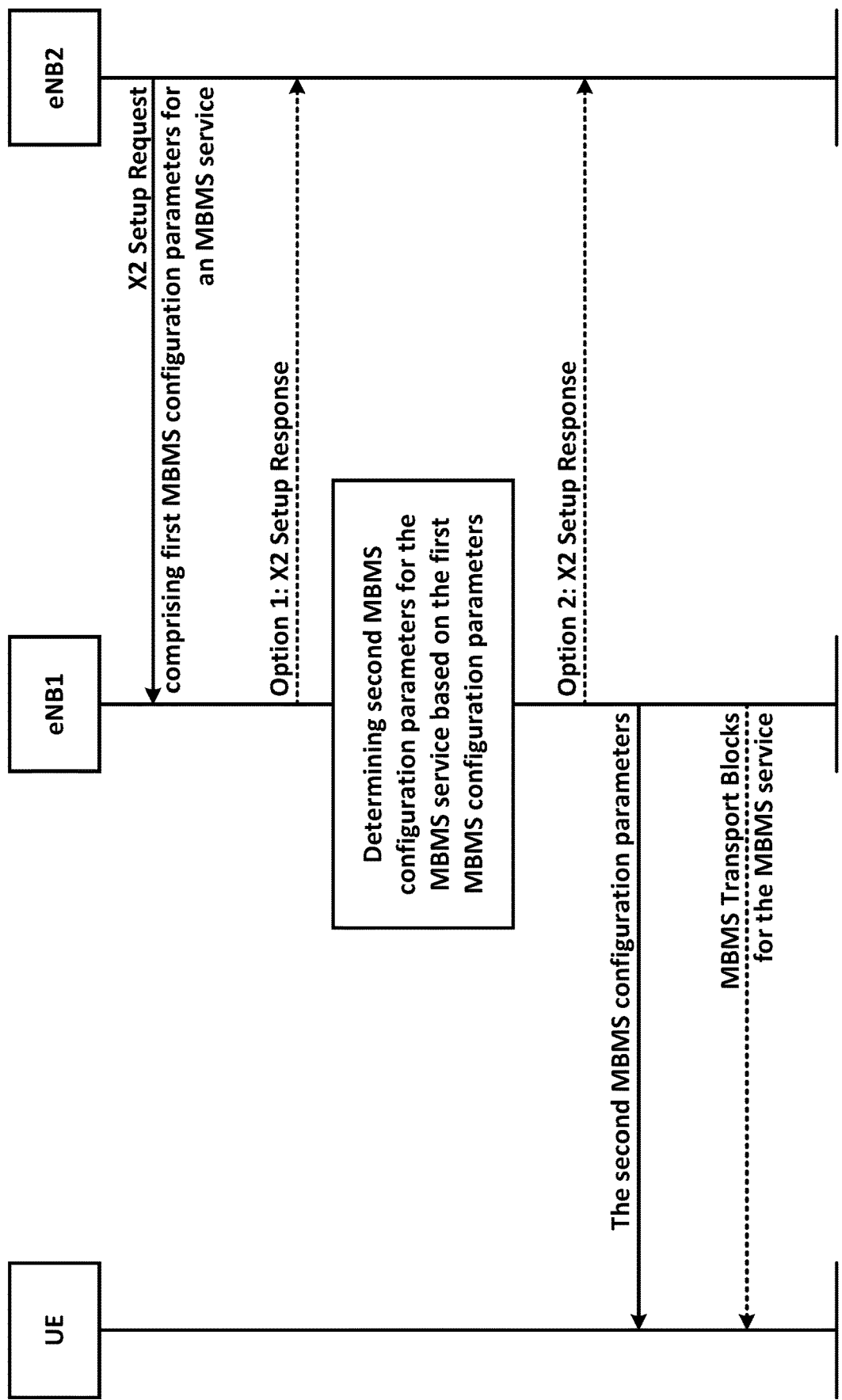
FIG. 12 is an example data flow diagram of an aspect of an embodiment of the present disclosure.
Figure 13:
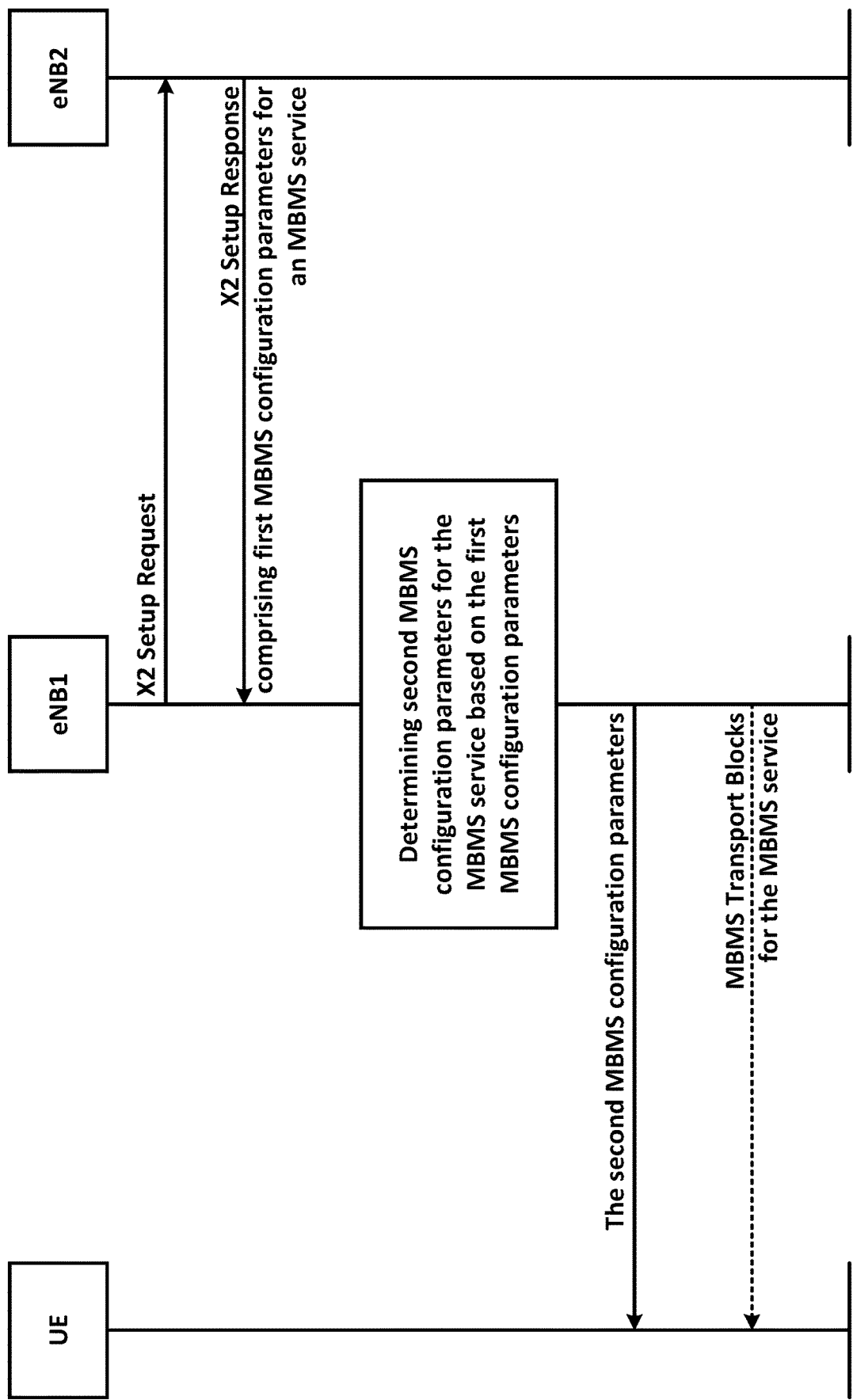
FIG. 13 is an example data flow diagram of an aspect of an embodiment of the present disclosure.
Figure 14:
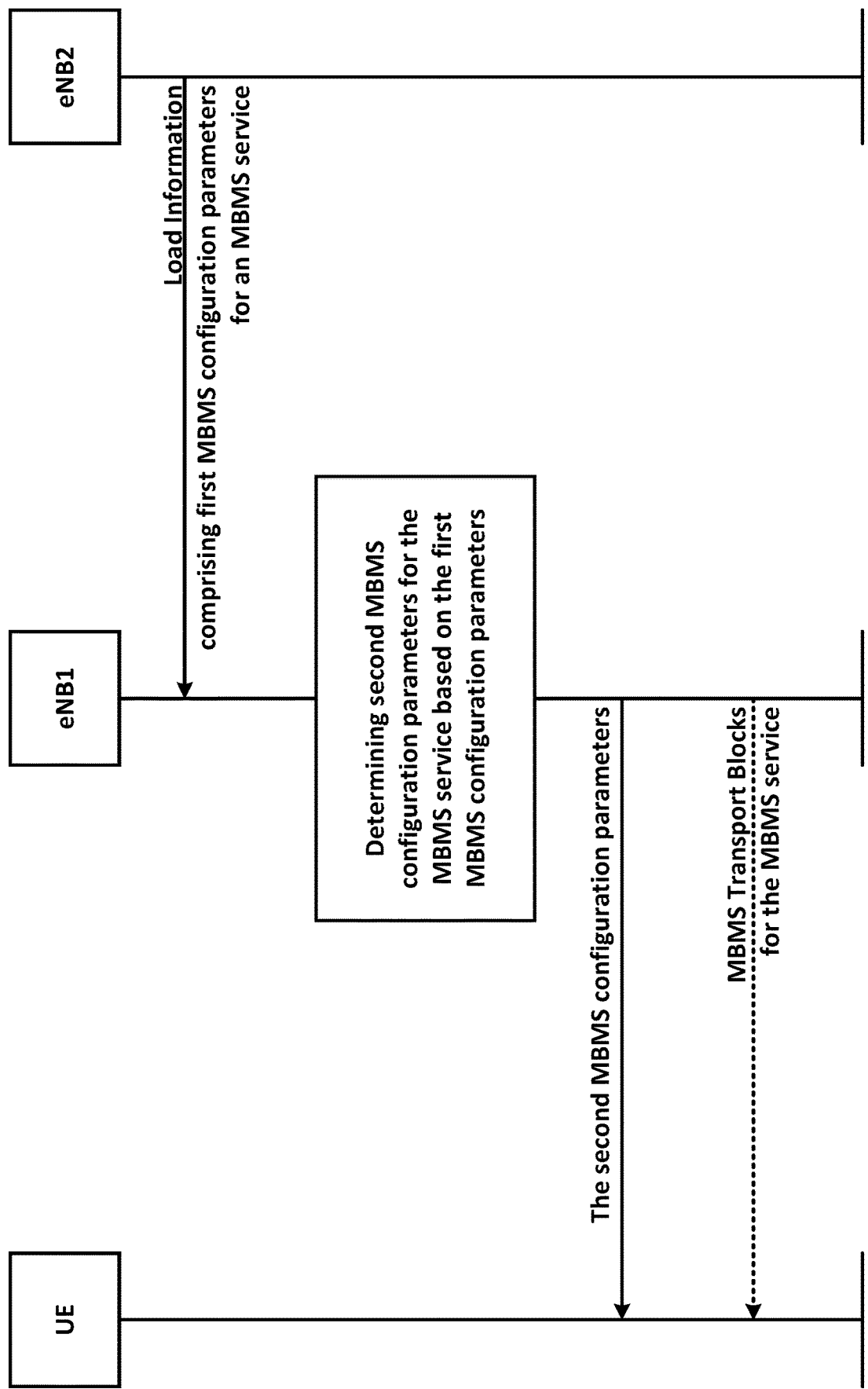
FIG. 14 is an example data flow diagram of an aspect of an embodiment of the present disclosure.
Figure 15:
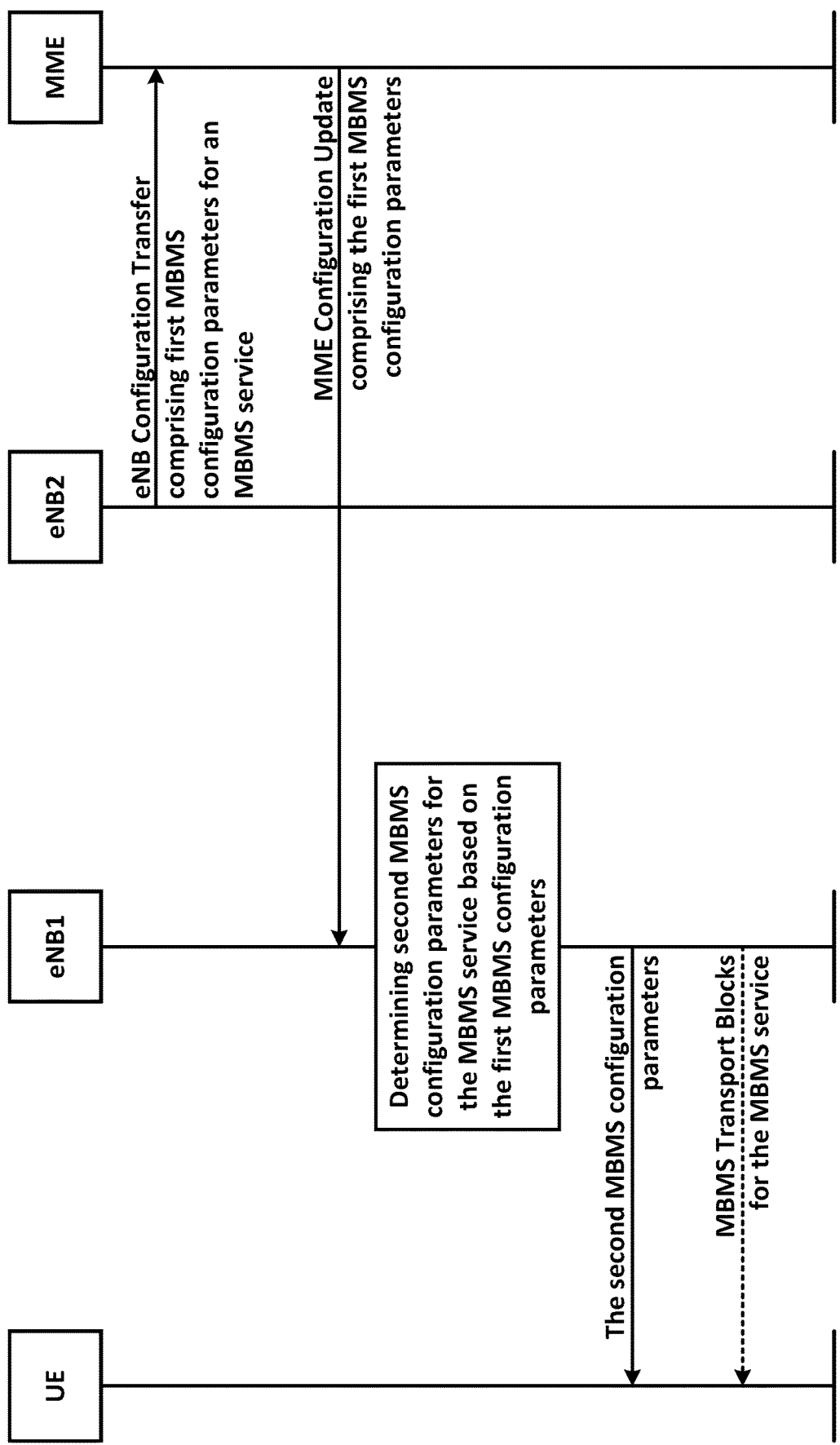
FIG. 15 is an example data flow diagram of an aspect of an embodiment of the present disclosure.
Figure 16:
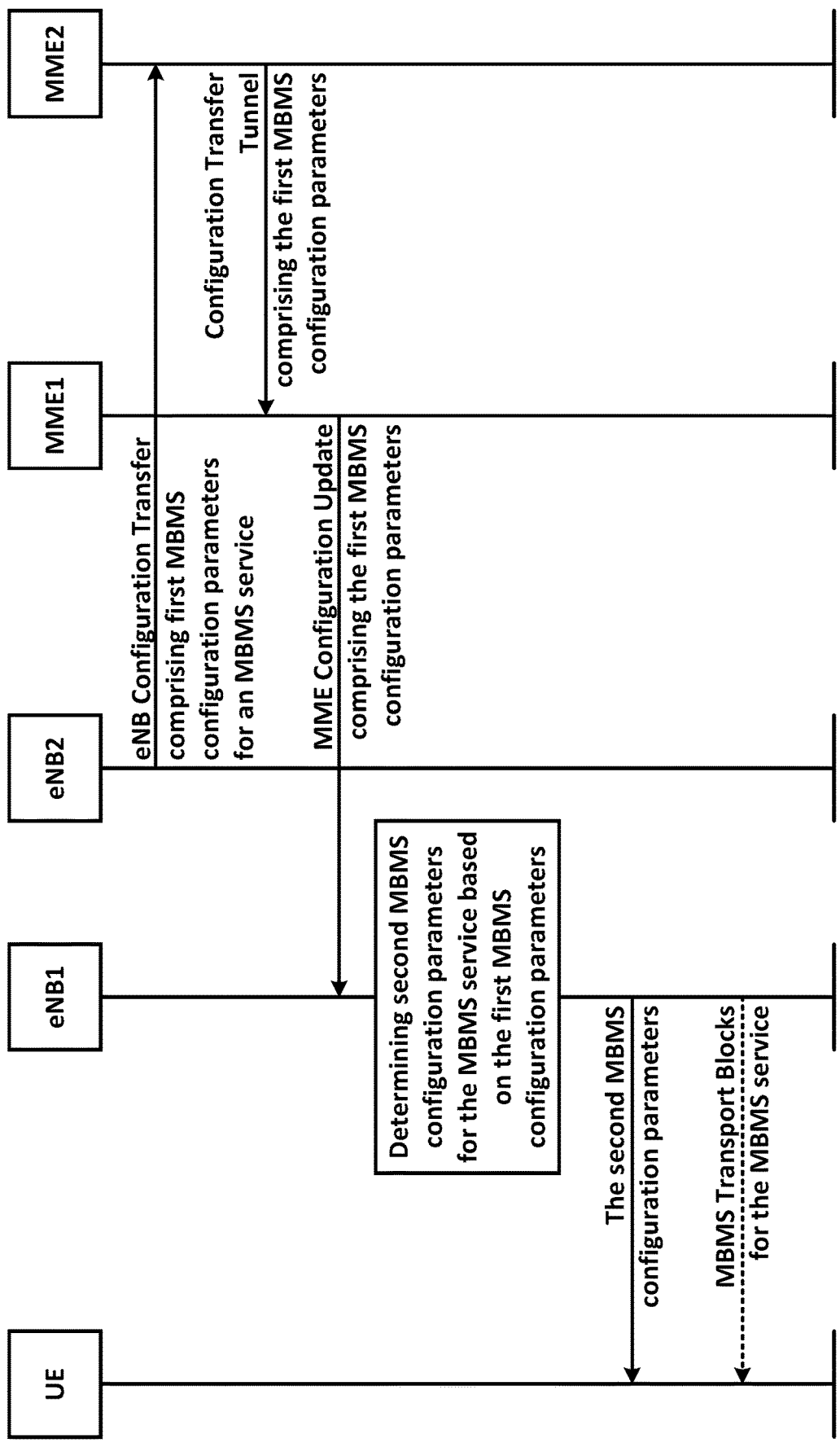
FIG. 16 is an example data flow diagram of an aspect of an embodiment of the present disclosure.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RB s, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, vehicle-to-everything (V2X) may operate based on based on PC5 (e.g. direct interface between wireless entity, sidelink). A UE (e.g. wireless device, vehicle, pedestrian, roadside unit, infrastructure, and/or the like) may transmit a V2X message to multiple UEs at a local area in sidelink. For vehicle-to-infrastructure (V2I), either transmitter UE or receiver UE(s) may be UE-type RSU. For vehicle-to-pedestrian (V2P), either transmitter UE or receiver UE(s) may be pedestrian UE.

In an example, UE may autonomously allocate resource, at least mode 2, based on semi-statically network-configured/pre-configured radio parameters. In an example, eNB (e.g. base station) may provide more UE specific or/and more dynamic resource allocation including mode 1.

In an example, UEs may communicate over PC5 across a single carrier, and/or UEs may communicate over PC5 across multiple carriers. In an example, UE may operate with single operator, and/or a set of PC5 operation carrier(s) may be shared by UEs subscribed to different operators. UEs belonging to different operators may transmit on the same carrier. In an example, each operator may be allocated with a different carrier. A UE may transmit on the carrier allocated to the operator which it may belong to. In an example, V2X may use dedicated carriers, and/or there may be no uplink (Uu) traffic on the PC5 operation carrier. In an example, V2X carrier may share with Uu. One or more of scenarios and combinations above may be considered in scope.

In an example, V2X may operate based on Uu. For V2V and V2P, a UE may transmit a V2X message to E-UTRAN in uplink and/or E-UTRAN may transmit it to multiple UEs at a local area in downlink. For V2I, when receiver is eNB type RSU, a UE may transmit a V2I message to E-UTRAN (e.g. eNB type RSU) in uplink; and/or when transmitter is eNB type RSU, E-UTRAN (e.g. eNB type RSU) may transmit a I2V message to multiple UEs at a local area in downlink. In an example, for V2N, the UE may communicate with an application server (e.g. traffic safety server). For V2P, either transmitter UE or receiver UE(s) may be pedestrian UE. To support this scenario, E-UTRAN may perform uplink reception and/or downlink transmission of V2X messages. For downlink, E-UTRAN may use a broadcast mechanism. In an example, E-UTRAN may support RSU for V2V and V2P operation.

In an example, eNB deployment may consider including possibility of network control. eNB deployment and/or network control for radio resources may be in uplink and/or downlink. For UL (uplink), UEs may perform uplink transmissions at a single carrier for V2X messages, and/or UEs may perform uplink transmissions across multiple carriers for V2X messages. For DL, UEs may perform downlink receptions at a single carrier for V2X messages, and/or UEs may perform downlink receptions across multiple carriers for V2X messages. In an example, UE may operate with single operator (i.e. message exchange across operators may not be assumed). In an example, a set of Uu operation carrier(s) may be shared by UEs subscribed to different operators, wherein UEs belonging to different operators may transmit on the shared uplink carrier(s) while receiving on the shared downlink carrier(s). In an example, operators may be allocated with a different carrier for uplink and/or downlink, wherein a UE may transmit on the uplink carrier(s) allocated to the operator to which it may belong to. The UE may receive on multiple DL carriers, i.e. UE may receive on the downlink carrier allocated to the other operator as well as the downlink carrier allocated to the operator to which it belongs. A UE may be allowed to receive downlink broadcast of another operator.

In an example, V2X may operate using both Uu and PC5. In this scenario, a UE may transmit a V2X message to other UEs in sidelink. One of the receiving UEs is a UE type RSU which receives the V2X message in sidelink and transmits it to E-UTRAN in uplink. E-UTRAN receives the V2X message from the UE type RSU and/or transmits it to multiple UEs at a local area in downlink.

In an example, E-UTRAN may perform uplink reception and/or downlink transmission of V2X messages. For downlink, E-UTRAN may use a broadcast mechanism. E-UTRAN may support RSU function. In an example, UE may transmit a V2X message to E-UTRAN in uplink, and/or E-UTRAN may transmit it to one or more UE type RSUs. The UE type RSU may transmit the V2X message to other UEs in sidelink. In an example, E-UTRAN may perform uplink reception and/or downlink transmission of V2X messages. For downlink, E-UTRAN may use a broadcast mechanism. E-UTRAN may support RSU function.

In an example, for both PC5 and Uu, PC5 operation carrier and/or Uu operation carrier may be allocated to the same operator. PC5 operation carrier and Uu operation carrier may be allocated to different operators. In this case, uplink operation carrier and/or downlink operation carrier may be allocated to the same operator. In an example, uplink operation carrier and/or downlink operation carrier may be allocated to different operators. In an example, dedicated operation carrier may be used for V2X on which there may be sidelink traffic but no uplink (Uu) traffic, i.e. uplink and sidelink may be on different carriers. In an example, the uplink carrier may be shared with sidelink, i.e. uplink and sidelink may be on the same carrier. In an example, the uplink carrier may be the dedicated operation carrier for V2X.

In an example, an RSU may terminate V2X packets, or forward V2X packets to other entities, such as an infrastructure, a vehicle, a pedestrian, a base station, and/or the like. This may be done in the V2X application layer of the RSU. Handling of V2X packet may be transparent to an eNB. In an example, if a P-GW is close to an eNB, backhaul delay may be significantly reduced. Local breakout may be beneficial in order to better fulfill stringent latency requirements of V2X services. This may enable a more local termination of V2X traffic instead of traversing an EPC. Locating a P-GW close to an eNB may also provide additional flexibility for location of a local E-UTRAN V2X server, for example, behind a L-GW (stand-alone or co-located with the eNB) or in an eNB itself. If SIPTO@LN is assumed to be deployed, it may be fully possible to leave this to the specific deployment.

In an example, a V2X server, connected through SIPTO@LN with stand-alone GW, may process data from an array of local sensors/cameras to distribute to locally connected vehicle UEs. Connectivity may be provided to local eNBs identified by the same LHN ID. By appropriately planning the LHN IDs with V2X service areas, V2X services may be provided to appropriate location in a proper way. Thanks to the characteristics of SIPTO@LN with stand-alone GW, connection to a V2X server may be maintained at vehicle UE mobility within LHN.

In an example, a V2X server, connected through SIPTO@LN with co-located L-GW, may be routed through a L-GW co-located in each eNB. In this case, a connection of a vehicle UE to a server may be taken down during mobility and/or set up again through an L-GW in a target eNB after handover has completed.

In an example, in a case of a V2X server co-located in an eNB, required functionality may be implemented in an eNB. An example of this may be a physical road-side box containing sensors (i.e. terminating all traffic locally) and/or an RSU, which may handle a relevant connection to vehicle UEs.

When using SIPTO@LN with stand-alone GW, an interface between a stand-alone GW and a V2X Server may be based on SGi. When using SIPTO@LN with co-located L-GW, an interface between a co-located L-GW and a V2X Server may be an internal interface or SGi.

In an example, V2X messages may be broadcasted in vicinity of an originating vehicle UE. An originating vehicle UE may send its V2X messages over an application layer to a V2X server. V2X messages may include information on a vehicle location (long, lat). A vehicle UE may provide cell-related information.

In an example, V2X messages may be generated in the V2X server or in road sensors, and/or distributed to vehicle UEs. In this case, V2X messages may be delivered using MBSFN or SC-PTM (or even unicast if feasible).

In an example, control information relevant for UEs supporting MBMS may be separated as much as possible from unicast control information. Most of the MBMS control information may be provided on a logical channel specific for MBMS common control information: the MCCH. E-UTRA may employ one MCCH logical channel per MBSFN area. In case that network configures multiple MBSFN areas, the UE may acquire the MBMS control information from the MCCHs that may be configured to identify if services it is interested to receive are ongoing. In an example, an action applicable when the UE is unable to simultaneously receive MBMS and/or unicast services may be up to UE implementation. In an example, an MBMS capable UE may be required to support reception of a single MBMS service at a time, and/or reception of more than one MBMS service (also possibly on more than one MBSFN area) in parallel may be left for UE implementation. The MCCH may carry an MBSFNAreaConfiguration message, which may indicate MBMS sessions that may be ongoing as well as (corresponding) radio resource configuration. MCCH may carry an MBMSCountingRequest message, when E-UTRAN wishes to count the number of UEs in RRC_CONNECTED that may be receiving or interested to receive one or more specific MBMS services.

A limited amount of MBMS control information may be provided on the BCCH. This primarily may concern the information needed to acquire the MCCH(s). This information may be carried by means of a single MBMS specific SystemInformationBlock: SystemInformationBlockType13. An MBSFN area may be identified by the mbsfn-AreaId in SystemInformationBlockType13. At mobility, the UE may consider that the MBSFN area may be continuous when the source cell and the target cell broadcast the same value in the mbsfn-AreaId.

MCCH information may be transmitted periodically, using a configurable repetition period. Scheduling information may be not provided for MCCH i.e. both the time domain scheduling as well as the lower layer configuration are semi-statically configured, as defined within SystemInformationBlockType13.

For MBMS user data, which may be carried by MTCH logical channel, E-UTRAN may periodically provide MCH scheduling information (MSI) at lower layers (MAC). This MCH information may concern time domain scheduling i.e. frequency domain scheduling and lower layer configuration may be semi-statically configured. The periodicity of the MSI may be configurable and defined by the MCH scheduling period.

Change of MCCH information may occur at specific radio frames, i.e. a concept of a modification period may be used. Within a modification period, the same MCCH information may be transmitted a number of times, as defined by its scheduling (which is based on a repetition period). Modification period boundaries may be defined by SFN values for which SFN mod m=0, where m may be the number of radio frames comprising a modification period. The modification period may be configured by means of SystemInformationBlockType13.

When the network changes (some of) the MCCH information, it may notify UEs about the change during a first modification period. In a next modification period, a network may transmit updated MCCH information. Upon receiving a change notification, a UE interested to receive MBMS services may acquire new MCCH information from the start of a next modification period. The UE may apply previously acquired MCCH information until the UE acquires the new MCCH information.

In an example, indication of an MBMS specific RNTI, the M-RNTI, on PDCCH may be used to inform UEs in RRC_IDLE and UEs in RRC_CONNECTED about an MCCH information change. When receiving an MCCH information change notification, a UE may know that the MCCH information will change at the next modification period boundary. A notification on PDCCH may indicate which of MCCHs will change, which may be done by means of an 8-bit bitmap. Within this bitmap, the bit at the position indicated by the field notificationIndicator may be used to indicate changes for that MBSFN area: if the bit is set to "1", the corresponding MCCH may change. An MCCH information change notification may be used to inform the UE about a change of MCCH information upon session start or about the start of MBMS counting.

MCCH information change notifications on PDCCH may be transmitted periodically and/or may be carried on MBSFN subframes only. These MCCH information change notification occasions may be common for all MCCHs that may be configured, and/or configurable by parameters included in SystemInformationBlockType13: a repetition coefficient, a radio frame offset and a subframe index. These common notification occasions may be based on MCCH with the shortest modification period.

In an example, E-UTRAN may modify MBMS configuration information provided on MCCH as updating the MBMS configuration information carried on BCCH i.e. at a coinciding BCCH and MCCH modification period. Upon detecting that a new MCCH is configured on BCCH, a UE interested to receive one or more MBMS services may acquire the MCCH, unless it knows that the services it may be interested in are not provided by the corresponding MBSFN area.

A UE that may be receiving an MBMS service via MRB may acquire MCCH information from a start of each modification period. A UE interested to receive MBMS from a carrier on which dl-Bandwidth included in MasterinformationBlock may be set to n6 may acquire the MCCH information at least once every MCCH modification period. A UE that is not receiving an MBMS service via MRB, as well as UEs that are receiving an MBMS service via MRB but potentially interested to receive other services not started yet in another MBSFN area from a carrier on which dl-Bandwidth included in MasterInformationBlock may be other than n6, may verify that stored MCCH information remains valid by attempting to find MCCH information change notification at least notificationRepetitionCoeff times during the modification period of the applicable MCCH(s), if no MCCH information change notification is received.

In case that a UE is aware which MCCH(s) E-UTRAN may use for service(s) it may be interested to receive, the UE may need to monitor change notifications for a subset of the MCCHs that may be configured, referred to as the 'applicable MCCH(s)'.

A UE may apply MCCH information acquisition procedure to acquire MBMS control information that may be broadcasted by E-UTRAN. A procedure may apply to MBMS capable UEs that may be in RRC_IDLE or in RRC_CONNECTED.

A UE interested to receive MBMS services may apply the MCCH information acquisition procedure upon entering a corresponding MBSFN area (e.g. upon power on, following UE mobility) and/or upon receiving a notification that MCCH information has changed. A UE that may be receiving an MBMS service may apply a MCCH information acquisition procedure to acquire MCCH, that may correspond with a service that may be being received, at a start of modification period.

Unless explicitly stated otherwise in a procedural specification, an MCCH information acquisition procedure may overwrite stored MCCH information, i.e. delta configuration may be not applicable for MCCH information and/or the UE discontinues using a field if it is absent in MCCH information.

An MBMS capable UE may: if the procedure is triggered by an MCCH information change notification: may start acquiring MBSFNAreaConfiguration message and/or MBMSCountingRequest message if present, from the beginning of a modification period following the one in which the change notification may be received. A UE may continue using previously received MCCH information until new MCCH information has been acquired. If a UE enters an MBSFN area: may acquire an MBSFNAreaConfiguration message and/or an MBMSCountingRequest message if present, at the next repetition period. If a UE is receiving an MBMS service: may start acquiring an MBSFNAreaConfiguration message and/or an MBMSCountingRequest message if present, that both concern the MBSFN area of the service that may be being received, from the beginning of modification period.

In an example, No UE requirements related to the contents of this MBSFNAreaConfiguration may apply other than those specified elsewhere e.g. within procedures using concerned system information, corresponding field descriptions. Upon receiving MBMSCountingRequest message, the UE may perform an MBMS Counting procedure.

In an example, an MBMS PTM radio bearer configuration procedure may be used by the UE to configure RLC, MAC and/or the physical layer upon starting and/or stopping to receive an MRB. The procedure may apply to UEs interested to receive one or more MBMS services.

In case the UE is unable to receive an MBMS service due to capability limitations, upper layers may take appropriate action e.g. terminate a lower priority unicast service.

In an example, a UE may apply an MRB establishment procedure to start receiving a session of a service it may have an interest in. The procedure may be initiated e.g. upon start of the MBMS session, upon (re-)entry of the corresponding MBSFN service area, upon becoming interested in the MBMS service, upon removal of UE capability limitations inhibiting reception of the concerned service.

A UE may apply an MRB release procedure to stop receiving a session. The procedure may be initiated e.g. upon stop of the MBMS session, upon leaving the corresponding MBSFN service area, upon losing interest in the MBMS service, when capability limitations may start inhibiting reception of the concerned service.

In an example, upon MRB establishment, the UE may: establish an RLC entity in accordance with the configuration; configure an MTCH logical channel in accordance with a received logicalChannelIdentity, applicable for an MRB, as included in an MBSFNAreaConfiguration message; configure a physical layer in accordance with a pmch-Config, applicable for an MRB, as included in an MBSFNAreaConfiguration message; and/or inform upper layers about an establishment of an MRB by indicating a corresponding tmgi and/or sessionId;

In an example, upon MRB release, a UE may: release an RLC entity as well as a related MAC and/or physical layer configuration; and/or inform upper layers about a release of an MRB by indicating corresponding tmgi and/or sessionId.

In an example, an MBMS Counting procedure may be used by an E-UTRAN to count the number of RRC_CONNECTED mode UEs which may be receiving via an MRB or interested to receive via an MRB specified MBMS services. A UE may determine interest in an MBMS service, that may be identified by the TMGI, by interaction with upper layers. An E-UTRAN may initiate a procedure by sending an MBMSCountingRequest message.

In an example, upon receiving an MBMSCountingRequest message, a UE in RRC_CONNECTED mode may: if a SystemInformationBlockType1, that provided scheduling information for the systemInformationBlockType13 that included configuration of an MCCH via which an MBMSCountingRequest message was received, contained an identity of a Registered PLMN. If a UE is receiving via an MRB or interested to receive via an MRB at least one of services in a received countingRequestList: if more than one entry is included in mbsfn-AreaInfoList received in SystemInformationBlockType13 that may be included configuration of an MCCH via which an MBMSCountingRequest message was received: include an mbsfn-AreaIndex in an MBMSCountingResponse message and/or set it to an index of entry in an mbsfn-AreaInfoList within a received SystemInformationBlockType13 that may correspond with an MBSFN area used to transfer a received MBMSCountingRequest message. For an MBMS service included in a received countingRequestList: if a UE is receiving via an MRB or interested to receive via an MRB this MBMS service: may include an entry in a countingResponseList within an MBMSCountingResponse message with countingResponseService set it to an index of entry in a countingRequestList within a received MBMSCountingRequest that may correspond with an MBMS service the UE is receiving or interested to receive; may submit an MBMSCountingResponse message to lower layers for transmission upon which the procedure ends.

UEs that are receiving an MBMS User Service by means of a Unicast Bearer Service (i.e. via a DRB), but are interested to receive a concerned MBMS User Service via an MBMS Bearer Service (i.e. via an MRB), respond to the counting request. If ciphering is used at upper layers, a UE may not respond to the counting request if it can not decipher the MBMS service for which counting is performed.

A UE may treat an MBMSCountingRequest messages received in a modification period independently. In a case E-UTRAN may repeat an MBMSCountingRequest (i.e.

including the same services) in a subsequent modification period, a UE may respond again. A UE may provide a one MBMSCountingResponse message to multiple transmission attempts of an MBMSCountingRequest messages in a given modification period.

A purpose of this procedure may be to inform E-UTRAN that a UE is receiving or is interested to receive MBMS service(s) via an MRB or SC-MRB, and if so, to inform E-UTRAN about a priority of MBMS versus unicast reception.

An MBMS or SC-PTM capable UE in RRC_CONNECTED may initiate a procedure in several cases including upon successful connection establishment, upon entering or leaving the service area, upon session start or stop, upon change of interest, upon change of priority between MBMS reception and unicast reception or upon change to a PCell broadcasting SystemInformationBlockType15.

Upon initiating the procedure, a UE may: if SystemInformationBlockType15 is broadcast by a PCell: ensure having a valid version of SystemInformationBlockType15 for a PCell; if the UE did not transmit an MBMSInterestIndication message since last entering RRC_CONNECTED state; or if since the last time the UE transmitted an MBMSInterestIndication message, a UE connected to a PCell not broadcasting SystemInformationBlockType15: if a set of MBMS frequencies of interest may not be empty: may initiate transmission of an MBMSInterestIndication message; else: if a set of MBMS frequencies of interest may have changed since a last transmission of an MBMSInterestIndication message; or if a prioritisation of reception of indicated MBMS frequencies compared to reception of the established unicast bearers has changed since a last transmission of an MBMSInterestIndication message: may initiate transmission of an MBMSInterestIndication message; else if SystemInformationBlockType20 is broadcast by the PCell: if since the last time a UE transmitted an MBMSInterestIndication message, the UE connected to a PCell not broadcasting SystemInformationBlockType20; or if a set of MBMS services of interest may be different from mbms-Services included in a last transmission of an MBMSInterestIndication message; may initiate a transmission of an MBMSInterestIndication message.

A UE may send an MBMSInterestIndication even when it is able to receive the MBMS services it is interested in i.e. to avoid that a network allocates a configuration inhibiting MBMS reception.

In an example, a UE may: consider a frequency to be part of the MBMS frequencies of interest if following conditions are met: at least one MBMS session a UE is receiving or interested to receive via an MRB or SC-MRB is ongoing or about to start; and/or for at least one of these MBMS sessions SystemInformationBlockType15 acquired from a PCell may include for a concerned frequency one or more MBMS SAIs as indicated in a USD for this session; and/or a UE is capable of simultaneously receiving MRBs and/or is capable of simultaneously receiving SC-MRBs on a set of MBMS frequencies of interest, regardless of whether a serving cell is configured on each of these frequencies or not; and/or a supportedBandCombination a UE included in UE-EUTRA-Capability may contain at least one band combination including a set of MBMS frequencies of interest.

A UE may determine whether a session is ongoing from a start and stop time indicated a User Service Description (USD). A UE may consider a frequency to be part of MBMS frequencies of interest even though E-UTRAN may (temporarily) not employ an MRB or SC-MRB for a concerned session. I.e. a UE may not verify if a session is indicated on (SC-)MCCH. A UE may consider frequencies of interest independently of any synchronization state. Indicating a frequency may imply that a UE supports SystemInformationBlockType13 or SystemInformationBlockType20 acquisition for a concerned frequency i.e. the indication may be independent of whether a serving cell is configured on that frequency. When evaluating which frequency it can receive simultaneously, a UE may not take into account serving frequencies that may be currently configured i.e. it may consider MBMS frequencies it is interested to receive. A set of MBMS frequencies of interest may include at most one frequency for a given physical frequency. A UE may consider a physical frequency to be part of MBMS frequencies of interest if it may support at least one of the bands indicated for this physical frequency in SystemInformationBlockType1 (for serving frequency) or SystemInformationBlockType15 (for neighbouring frequencies). In this case, E-UTRAN may assume the UE supports MBMS reception on any of the bands supported by the UE (i.e. according to supportedBandCombination).

A UE may: consider a MBMS service to be part of MBMS services of interest if following conditions are met: the UE is SC-PTM capable; and the UE is receiving or interested to receive this service via an SC-MRB; and one session of this service is ongoing or about to start; and one or more MBMS SAIs in the USD for this service is included in SystemInformationBlockType15 acquired from a PCell for a frequency belonging to a set of MBMS frequencies of interest.

A UE may set the contents of the MBMSInterestIndication message as follows: if a set of MBMS frequencies of interest is not empty: include mbms-FreqList and/or set it to include MBMS frequencies of interest sorted by decreasing order of interest, using EARFCN corresponding with freqBandIndicator included in SystemInformationBlockType1 (for serving frequency), if applicable, and EARFCN(s) as included in SystemInformationBlockType15 (for neighbouring frequencies); include mbms-Priority if a UE prioritises reception of all indicated MBMS frequencies above reception of any of unicast bearers; if SystemInformationBlockType20 is broadcast by a PCell: include mbms-Services and/or set it to indicate a set of MBMS services of interest.

An EARFCN included in mbms-FreqList may be used to indicate a physical frequency a UE is interested to receive i.e. a UE may not support a band corresponding to an included EARFCN (but it may support at least one of bands indicated in system information for a concerned physical frequency). If a UE prioritises MBMS reception and unicast data may not be supported because of congestion on the MBMS carrier(s), E-UTRAN may initiate release of unicast bearers. It may be up to E-UTRAN implementation whether all bearers or only GBR bearers are released. E-UTRAN may not initiate re-establishment of the released unicast bearers upon alleviation of congestion. A UE may submit an MBMSInterestIndication message to lower layers for transmission.

In an example, SC-PTM control information may be provided on a specific logical channel: an SC-MCCH. An SC-MCCH may carry an SCPTMConfiguration message which may indicate MBMS sessions that may be ongoing as well as (corresponding) information on when each session may be scheduled, i.e. scheduling period, scheduling window, and/or start offset. An SCPTMConfiguration message may provide information about neighbour cells transmitting MBMS sessions which may be ongoing on the current cell.

A limited amount of SC-PTM control information may be provided on a BCCH. This may concern information needed to acquire an SC-MCCH.

In an example, SC-MCCH information (i.e. information transmitted in messages sent over SC-MCCH) may be transmitted periodically, using a configurable repetition period. SC-MCCH transmissions (and the associated radio resources and MCS) may be indicated on PDCCH.

Change of SC-MCCH information may occur at specific radio frames, i.e. a concept of a modification period may be used. Within a modification period, a same SC-MCCH information may be transmitted a number of times, as defined by its scheduling (which may be based on a repetition period). Modification period boundaries may be defined by SFN values for which SFN mod m=0, where m may be a number of radio frames comprising a modification period. A modification period may be configured by means of SystemInformationBlockType20.

When a network changes (some of) SC-MCCH information, it may notify UEs about a change in a first subframe which may be used for SC-MCCH transmission in a repetition period. LSB bit in 8-bit bitmap when set to '1' may indicate a change in SC-MCCH. Upon receiving a change notification, a UE interested to receive MBMS services transmitted using SC-PTM may acquire new SC-MCCH information starting from a same subframe. A UE may apply previously acquired SC-MCCH information until the UE acquires new SC-MCCH information.

In an example, a SC-PTM capable UE receiving or interested to receive MBMS service(s) via SC-MRB may apply SC-PTM procedures and/or a MBMS interest indication procedure.

In an example, a UE may apply an SC-MCCH information acquisition procedure to acquire SC-PTM control information that may be broadcast by E-UTRAN. The procedure may apply to SC-PTM capable UEs that are in RRC_IDLE or in RRC_CONNECTED.

A UE interested to receive MBMS services via SC-MRB may apply the SC-MCCH information acquisition procedure upon entering the cell broadcasting SystemInformationBlockType20 (e.g. upon power on, following UE mobility) and upon receiving a notification that SC-MCCH information may have changed. A UE that is receiving an MBMS service via SC-MRB may apply an SC-MCCH information acquisition procedure to acquire SC-MCCH information that may correspond with a service that may be being received, at the start of a modification period.

An SC-MCCH information acquisition procedure may overwrite stored SC-MCCH information, i.e. delta configuration may not be applicable for SC-MCCH information and a UE may discontinue using a field if it is absent in SC-MCCH information.

A SC-PTM capable UE may: if a procedure is triggered by an SC-MCCH information change notification: start acquiring an SCPTMConfiguration message from a subframe where a change notification may be received; if a UE enters a cell broadcasting SystemInformationBlockType20: may acquire an SCPTMConfiguration message at a next repetition period; if the UE is receiving an MBMS service via an SC-MRB: may start acquiring an SCPTMConfiguration message from a beginning of modification period. A UE may continue using a previously received SC-MCCH information until new SC-MCCH information has been acquired. No UE requirements related to contents of this SCPTMConfiguration may apply other than those specified elsewhere e.g. within procedures using concerned system information, corresponding field descriptions.

An SC-PTM radio bearer configuration procedure may be used by a UE to configure RLC, MAC, and/or a physical layer upon starting and/or stopping to receive an SC-MRB transmitted on SC-MTCH. The procedure may apply to SC-PTM capable UEs that may be in RRC_CONNECTED or in RRC_IDLE and may be interested to receive one or more MBMS services via SC-MRB.

In case a UE is unable to receive an MBMS service via an SC-MRB due to capability limitations, upper layers may take appropriate action e.g. terminate a lower priority unicast service.

A UE may apply an SC-MRB establishment procedure to start receiving a session of a MBMS service it may have an interest in. The procedure may be initiated e.g. upon start of an MBMS session, upon entering a cell providing via SC-MRB a MBMS service in which a UE may have interest, upon becoming interested in an MBMS service, upon removal of UE capability limitations inhibiting reception of a concerned service.

A UE may apply an SC-MRB release procedure to stop receiving a session. The procedure may be initiated e.g. upon stop of an MBMS session, upon leaving a cell where a SC-MRB is established, upon losing interest in an MBMS service, when capability limitations start inhibiting reception of a concerned service.

Upon SC-MRB establishment, a UE may: establish an RLC entity in accordance with configuration; configure a SC-MTCH logical channel applicable for an SC-MRB and/or instruct MAC to receive DL-SCH on a cell where an SCPTMConfiguration message was received for an MBMS service for which an SC-MRB may be established and/or using g-RNTI and/or sc-mtch-SchedulingInfo (if included) in this message for this MBMS service: configure a physical layer in accordance with an sc-mtch-InfoList, applicable for an SC-MRB, as included in an SCPTMConfiguration message; and/or inform upper layers about an establishment of an SC-MRB by indicating a corresponding tmgi and/or sessionId;

Upon SC-MRB release, a UE may: release an RLC entity as well as a related MAC and/or physical layer configuration; and/or inform upper layers about a release of an SC-MRB by indicating a corresponding tmgi and/or sessionId.

An MBMSCountingRequest message may be used by E-UTRAN to count UEs that are receiving or interested to receive specific MBMS services. An MBMSCountingResponse message may be used by a UE to respond to an MBMSCountingRequest message. An MBMSInterestIndication message may be used to inform E-UTRAN that a UE is receiving/interested to receive or no longer receiving/interested to receive MBMS via an MRB or SC-MRB.

An mbms-FreqList may be a list of MBMS frequencies on which a UE is receiving or interested to receive MBMS via an MRB or SC-MRB. An mbms-Priority may indicate whether a UE prioritises MBMS reception above unicast reception. A field may be present (i.e. value true), if a UE prioritises reception of listed MBMS frequencies above reception of unicast bearers. Otherwise the field may be absent.

An MBSFNAreaConfiguration message may contain MBMS control information applicable for an MBSFN area. For MBSFN area included in SystemInformationBlockType13 E-UTRAN may configure an MCCH (i.e. the MCCH identifies the MBSFN area) and/or signals the MBSFNAreaConfiguration message. An SCPTMConfiguration message may contain control information applicable for MBMS services transmitted via SC-MRB. An sc-mtch- InfoList may provide configuration of SC-MTCH in a current cell. An scptm-NeighbourCellList may be a list of neighbour cells providing MBMS services via SC-MRB. When absent, a UE may assume that MBMS services listed in the SCPTMConfiguration message may not be provided via SC-MRB in any neighbour cell. An IE MBMS-NotificationConfig may specify MBMS notification related configuration parameters, that may be applicable for MBSFN areas. An IE MBMS-ServiceList may provide a list of MBMS services which a UE is receiving or interested to receive. An IE MBSFN-AreaInfoList may contain information required to acquire MBMS control information associated with one or more MBSFN areas. An IE MBSFN-SubframeConfig may define subframes that may be reserved for MBSFN in downlink. An IE PMCH-InfoList may specify configuration of PMCHs of an MBSFN area, while IE PMCH-InfoListExt may include additional PMCHs, i.e. extend PMCH list using general principles. Information provided for an individual PMCH may include configuration parameters of sessions that are carried by a concerned PMCH. For PMCH that E-UTRAN may include in PMCH-InfoList, a list of ongoing sessions may have at least one entry. An IE SC-MTCH-InfoList may provide a list of ongoing MBMS sessions transmitted via SC-MRB and for MBMS session, an associated G-RNTI and scheduling information.

In an example, an mbmsSessionInfo may indicate an ongoing MBMS session in a SC-MTCH. A g-RNTI may be used to scramble scheduling and transmission of a SC-MTCH. An IE SCPTM-NeighbourCellList may indicate a list of neighbour cells where ongoing MBMS sessions provided via SC-MRB in current cells may be also provided. A sessionId may indicate an optional MBMS Session Identity, which together with TMGI may identify a transmission or a possible retransmission of a specific MBMS session. The field may be included when upper layers have assigned a session identity i.e. one may be available for an MBMS session in E-UTRAN. A serviceId may identify an identity of an MBMS service within a PLMN. The field may contain octet 3-5 of an IE Temporary Mobile Group Identity (TMGI). A first octet may contain a third octet of the TMGI, a second octet may contain a fourth octet of the TMGI and so on.

In a legacy system, a wireless device employing V2X services may experience a service interruption during a handover or a dual connectivity procedure because the wireless device needs to receive system information to get MBMS configuration parameters for the V2X services at a target base station. The wireless device may experience a service interruption for duration of a system information transmission periodicity at a target base station. In an example embodiment, neighboring base stations share MBMS configuration parameters for one or more MBMS services (e.g. V2X services). A first base station receives MBMS configuration parameters from a second base station, and determines its MBMS configuration parameters based on the MBMS configuration parameters received from the second base station. By employing identical MBMS configuration parameters (e.g. DRX inactivity timer, scheduling period start offset for MBMS service, and/or the like) between neighboring base stations, during a handover procedure or a dual connectivity initiation/modification procedure, a wireless device may be able to receive a V2X service at a target base station without waiting a system information block containing MBMS configuration parameters for the V2X service.

An issue with respect to exchanging a G-RNTI parameter and/or MBMS (MBMS, SC-PTM, and/or V2X) resource parameter for an MBMS (MBMS, SC-PTM, and/or V2X) service between eNBs is how to reduce a service interruption time of MBMS (MBMS, SC-PTM, and/or V2X) services for a UE during a handover and/or SeNB addition/modification procedure. For SC-PTM, during a handover and/or an SeNB addition/modification, an MBMS (MBMS, SC-PTM, and/or V2X) service for a UE may be interrupted because the UE may need to get a new G-RNTI parameter and/or new MBMS (MBMS, SC-PTM, and/or V2X) resource parameter in a new cell if a current cell and a new cell may use a different G-RNTI parameter and/or different MBMS (MBMS, SC-PTM, and/or V2X) resource parameter for a same MBMS (MBMS, SC-PTM, and/or V2X) service. In an example embodiment, neighboring eNBs serving a same MBMS (MBMS, SC-PTM, and/or V2X) service may share a same G-RNTI parameter and/or same MBMS (MBMS, SC-PTM, and/or V2X) resource parameter by exchanging the G-RNTI parameter and/or MBMS (MBMS, SC-PTM, and/or V2X) resource parameter for the MBMS (MBMS, SC-PTM, and/or V2X) service between eNB s.

In an example embodiment, an eNB may transmit a G-RNTI parameter and/or MBMS (MBMS, SC-PTM, and/or V2X) resource parameter associated with an MBMS (MBMS, SC-PTM, and/or V2X) service provided in a cell of the eNB to another eNB. In an example, the MBMS (MBMS, SC-PTM, and/or V2X) resource parameter may comprise TMGI, MBMS session ID, SC-MTCH neighbour cell (neighbor cells that provide this MBMS service on SC-MTCH), radioframe allocation period, radioframe allocation offset, subframe allocation information, and/or SC-MTCH scheduling information associated with an MBMS (MBMS, SC-PTM, and/or V2X) service. The SC-MTCH scheduling information may comprise onDurationTimerSCPTM, drx-InactivityTimerSCPTM, and/or schedulingPeriodStartOffsetSCPTM.

In an example, after receiving a G-RNTI parameter and/or MBMS (MBMS, SC-PTM, and/or V2X) resource parameter associated with an MBMS (MBMS, SC-PTM, and/or V2X) service from a neighboring eNB, a current eNB may provide the MBMS (MBMS, SC-PTM, and/or V2X) service provided in a cell of the neighboring eNB in its cell with the same G-RNTI parameter and/or same MBMS (MBMS, SC-PTM, and/or V2X) resource parameter received from the neighboring eNB. Thereafter, for example, a UE moving from a source cell of the current eNB to a target cell of the neighboring eNB may not need to get a new G-RNTI parameter and/or new MBMS (MBMS, SC-PTM, and/or V2X) resource parameter in the target cell because the source cell and the target cell may use the same G-RNTI parameter and/or same MBMS (MBMS, SC-PTM, and/or V2X) resource parameter for the same MBMS (MBMS, SC-PTM, and/or V2X) service. Moreover, in another example, a UE, connected to the current eNB (MeNB), adding and/or modifying a secondary cell of the neighboring eNB (SeNB) may not need to get a new G-RNTI parameter and/or new MBMS (MBMS, SC-PTM, and/or V2X) resource parameter for the secondary cell because the current cell and the secondary cell may use the same G-RNTI parameter and/or same MBMS (MBMS, SC-PTM, and/or V2X) resource parameter for the same MBMS (MBMS, SC-PTM, and/or V2X) service. The UE may receive the MBMS (MBMS, SC-PTM, and/or V2X) service in the target cell and/or the secondary cell with the same G-RNTI parameter and/or same MBMS (MBMS, SC-PTM, and/or V2X) resource parameter that the UE may have received in the current cell.

In an example embodiment, a first eNB may transmit a first message to a second eNB. The second eNB may transmit a second message to the first eNB. The first message, for example, may be an X2 setup request message, and the second message may be an X2 setup response message, wherein the first message and the second message may be exchanged as a part of an X2 setup procedure. In an example, the first message and/or the second message may comprise a G-RNTI parameter and/or MBMS (MBMS, SC-PTM, and/or V2X) resource parameter associated with an MBMS (MBMS, SC-PTM, and/or V2X) service. In an example, a served cell information IE in the X2 setup request message and/or the X2 setup response message may comprise the G-RNTI parameter and/or MBMS (MBMS, SC-PTM, and/or V2X) resource parameter. In an example, after receiving a G-RNTI parameter and/or MBMS (MBMS, SC-PTM, and/or V2X) resource parameter for an MBMS (MBMS, SC-PTM, and/or V2X) service via the first message, the second eNB may configure its G-RNTI parameter and/or MBMS (MBMS, SC-PTM, and/or V2X) resource parameter based on the received G-RNTI parameter and/or MBMS (MBMS, SC-PTM, and/or V2X) resource parameter for the MBMS (MBMS, SC-PTM, and/or V2X) service. In an example, the second eNB may transmit its configured G-RNTI parameter and/or MBMS (MBMS, SC-PTM, and/or V2X) resource parameter to the first eNB via the second message, and the first eNB may configure its G-RNTI parameter and/or MBMS (MBMS, SC-PTM, and/or V2X) resource parameter based on the received G-RNTI parameter and/or MBMS (MBMS, SC-PTM, and/or V2X) resource parameter for the MBMS (MBMS, SC-PTM, and/or V2X) service. In an example, after configuring the G-RNTI parameter and/or MBMS (MBMS, SC-PTM, and/or V2X) resource parameter, the first eNB and/or the second eNB may transmit MBMS (MBMS, SC-PTM, and/or V2X) packets employing the G-RNTI parameter and/or MBMS (MBMS, SC-PTM, and/or V2X) resource parameter.

In another example embodiment, a first eNB may transmit a first message to a second eNB. The second eNB may transmit a second message to the first eNB. The first message, for example, may be an eNB configuration update message, and the second message may be an eNB configuration update acknowledge message, wherein the first message and the second message may be exchanged as a part of an eNB configuration update procedure. In an example, the first message may comprise a G-RNTI parameter and/or MBMS (MBMS, SC-PTM, and/or V2X) resource parameter associated with an MBMS (MBMS, SC-PTM, and/or V2X) service. In an example, a served cell information IE in the eNB configuration update message may comprise the G-RNTI parameter and/or MBMS (MBMS, SC-PTM, and/or V2X) resource parameter. In an example, after receiving a G-RNTI parameter and/or MBMS (MBMS, SC-PTM, and/or V2X) resource parameter for an MBMS (MBMS, SC-PTM, and/or V2X) service via the first message, the second eNB may configure its G-RNTI parameter and/or MBMS (MBMS, SC-PTM, and/or V2X) resource parameter based on the received G-RNTI parameter and/or MBMS (MBMS, SC-PTM, and/or V2X) resource parameter for the MBMS (MBMS, SC-PTM, and/or V2X) service. Thereafter, the second eNB, for example, may send the second message to the first eNB. In an example, after configuring the G-RNTI parameter and/or MBMS (MBMS, SC-PTM, and/or V2X) resource parameter, the second eNB may transmit MBMS (MBMS, SC-PTM, and/or V2X) packets employing the G-RNTI parameter and/or MBMS (MBMS, SC-PTM, and/or V2X) resource parameter.

In another example embodiment, a first eNB may transmit a message to a second eNB. The message, for example, may be a load information message, wherein the message may be transmitted as a part of a load indication procedure. In an example, the message may comprise a G-RNTI parameter and/or MBMS (MBMS, SC-PTM, and/or V2X) resource parameter associated with an MBMS (MBMS, SC-PTM, and/or V2X) service. In an example, a cell information IE in the load information message may comprise the G-RNTI parameter and/or MBMS (MBMS, SC-PTM, and/or V2X) resource parameter. In an example, after receiving a G-RNTI parameter and/or MBMS (MBMS, SC-PTM, and/or V2X) resource parameter for an MBMS (MBMS, SC-PTM, and/or V2X) service via the message, the second eNB may configure its G-RNTI parameter and/or MBMS (MBMS, SC-PTM, and/or V2X) resource parameter based on the received G-RNTI parameter and/or MBMS (MBMS, SC-PTM, and/or V2X) resource parameter for the MBMS (MBMS, SC-PTM, and/or V2X) service. In an example, after configuring the G-RNTI parameter and/or MBMS (MBMS, SC-PTM, and/or V2X) resource parameter, the second eNB may transmit MBMS (MBMS, SC-PTM, and/or V2X) packets employing the G-RNTI parameter and/or MBMS (MBMS, SC-PTM, and/or V2X) resource parameter.

In an example embodiment, a first eNB may transmit a first message to an MME. The MME may transmit a second message to a second eNB. The first message, for example, may be an eNB configuration transfer message, and the second message may be an MME configuration transfer message. In an example, the first message may comprise a G-RNTI parameter and/or MBMS (MBMS, SC-PTM, and/or V2X) resource parameter associated with an MBMS (MBMS, SC-PTM, and/or V2X) service, and the second message may comprise the information elements that the first message contains. In an example, after receiving a G-RNTI parameter and/or MBMS (MBMS, SC-PTM, and/or V2X) resource parameter for an MBMS (MBMS, SC-PTM, and/or V2X) service via the first message and the second message, the second eNB may configure its G-RNTI parameter and/or MBMS (MBMS, SC-PTM, and/or V2X) resource parameter based on the received G-RNTI parameter and/or MBMS (MBMS, SC-PTM, and/or V2X) resource parameter for the MBMS (MBMS, SC-PTM, and/or V2X) service. In an example, after configuring the G-RNTI parameter and/or MBMS (MBMS, SC-PTM, and/or V2X) resource parameter, the second eNB may transmit MBMS (MBMS, SC-PTM, and/or V2X) packets employing the G-RNTI parameter and/or MBMS (MBMS, SC-PTM, and/or V2X) resource parameter.

In an example embodiment, a first eNB may transmit a first message to a first MME. The first MME may transmit a second message to a second MME. The second MME may transmit a third message to a second eNB. The first message, for example, may be an eNB configuration transfer message, the second message may be a configuration transfer tunnel message, and the third message may be an MME configuration transfer message. In an example, the first message may comprise a G-RNTI parameter and/or MBMS (MBMS, SC-PTM, and/or V2X) resource parameter associated with an MBMS (MBMS, SC-PTM, and/or V2X) service, and the second message and the third message may comprise the information elements that the first message contains. In an example, after receiving a G-RNTI parameter and/or MBMS (MBMS, SC-PTM, and/or V2X) resource parameter for an MBMS (MBMS, SC-PTM, and/or V2X) service via the first message and the second message, the second eNB may configure its G-RNTI parameter and/or MBMS (MBMS, SC-PTM, and/or V2X) resource parameter based on the received G-RNTI parameter and/or MBMS (MBMS, SC-PTM, and/or V2X) resource parameter for the MBMS (MBMS, SC-PTM, and/or V2X) service. In an example, after configuring the G-RNTI parameter and/or MBMS (MBMS, SC-PTM, and/or V2X) resource parameter, the second eNB may transmit MBMS (MBMS, SC-PTM, and/or V2X) packets employing the G-RNTI parameter and/or MBMS (MBMS, SC-PTM, and/or V2X) resource parameter.

In an example, a first base station may set an MBMS (MBMS, SC-PTM, and/or V2X) configuration, the MBMS (MBMS, SC-PTM, and/or V2X) configuration comprising at least one of G-RNTI or MBMS (MBMS, SC-PTM, and/or V2X) resource scheduling to provide to one or more wireless devices at least one of one or more MBMS (MBMS, SC-PTM, and/or V2X) services. The first base station may transmit, to a second base station, a first message comprising the MBMS (MBMS, SC-PTM, and/or V2X) configuration. The second base station may update an MBMS (MBMS, SC-PTM, and/or V2X) configuration at least based on the MBMS (MBMS, SC-PTM, and/or V2X) configuration received from the first base station to provide to one or more wireless devices at least one of the one or more MBMS (MBMS, SC-PTM, and/or V2X) services.

In an example, a first base station may receive, from a second base station, a first message comprising first MBMS (MBMS, SC-PTM, and/or V2X) configuration employed by the second base station. The first MBMS (MBMS, SC-PTM, and/or V2X) configuration may comprise at least one of a G-RNTI parameter or MBMS (MBMS, SC-PTM, and/or V2X) resource parameter to provide one or more MBMS (MBMS, SC-PTM, and/or V2X) services to one or more first wireless devices. The first base station may determine second MBMS (MBMS, SC-PTM, and/or V2X) configuration at least based on the first MBMS (MBMS, SC-PTM, and/or V2X) configuration. The second MBMS configuration may be to provide to one or more second wireless devices the one or more MBMS (MBMS, SC-PTM, and/or V2X) services. The first base station may transmit MBMS (MBMS, SC-PTM, and/or V2X) packets employing the second MBMS (MBMS, SC-PTM, and/or V2X) configuration.

In an example, the MBMS (MBMS, SC-PTM, and/or V2X) resource parameter may comprise one or more subframe scheduling information of the one or more MBMS (MBMS, SC-PTM, and/or V2X) services. The subframe scheduling information may comprise at least one of: TMGI; MBMS session ID; SC-MTCH neighbour cell (that provides this MBMS (MBMS, SC-PTM, and/or V2X) service on SC-MTCH); SC-MTCH scheduling information comprising at least one of onDurationTimerSCPTM, drx-InactivityTimerSCPTM, or schedulingPeriodStartOffsetSCPTM; radioframe allocation period; radioframe allocation offset; or subframe allocation information.

The second base station may further transmit MBMS (MBMS, SC-PTM, and/or V2X) packets employing the first MBMS (MBMS, SC-PTM, and/or V2X) configuration. The first base station may further transmit at least one of an updated SIB20 or an updated SCPTMConfiguration message comprising one or more parameters for at least one of the one or more MBMS (MBMS, SC-PTM, and/or V2X) services. The first base station may further configure the wireless device to receive at least one of the one or more MBMS (MBMS, SC-PTM, and/or V2X) services. The first base station may further transmit traffic associated with at least one of the one or more MBMS (MBMS, SC-PTM, and/or V2X) services. The first base station may further update one or more traffic parameters of at least one of the one or more MBMS (MBMS, SC-PTM, and/or V2X) services. The first base station may receive, from the second base station indirectly through one or two MME, at least one of the elements of the first message.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 17 is an example flow diagram as per an aspect of an embodiment of the present disclosure. At 1710, a first base station may receive from a second base station, an eNB configuration update message comprising one or more multimedia broadcast multicast service (MBMS) configuration parameters employed by a first cell of the second base station. The one or more MBMS configuration parameters may comprise: at least one temporary mobile group identity (TMGI) of at least one MBMS service; a first discontinuous reception inactivity timer; and a first scheduling period start offset. At 1720, the first base station may determine a second discontinuous reception inactivity timer and a second scheduling period start offset for the at least one MBMS service of the at least one TMGI. The determination may be based on the first discontinuous reception inactivity timer and the first scheduling period start offset. At 1730, the first base station may transmit to at least one wireless device, the second discontinuous reception inactivity timer and the second scheduling period start offset. At 1740, the first base station may transmit to the at least one wireless device, MBMS transport blocks for the at least one MBMS service based on the second discontinuous reception inactivity timer and the second scheduling period start offset.

According to an embodiment, the one or more MBMS configuration parameters may further comprise at least one of: an MBMS session identifier; a group-radio network temporary identifier (G-RNTI) parameter; single cell multicast traffic channel (SC-MTCH) scheduling parameters comprising an on-duration timer single cell point to multipoint (SCPTM); a cell identifier of an SC-MTCH neighbor cell providing at least one of the one or more MBMS services via an SC-MTCH; a radio frame allocation period; a radio frame allocation offset; or one or more subframe allocation parameters. According to an embodiment, the eNB configuration update message may further comprise at least one of: an MBMS frequency; an MBMS session identifier; a group-radio network temporary identifier (G-RNTI) of an MBMS service or a vehicle-to-everything (V2X) service; a destination layer-2 identifier for an MBMS service or a V2X service; an MBMS service priority; or a V2X service priority. According to an embodiment, the first base station may transmit to the second base station in response to the eNB configuration update message, an eNB configuration update acknowledge message indicating an acknowledgement of an MBMS configuration update based on the one or more MBMS configuration parameters. According to an embodiment, the first base station may transmit one message of an updated SIB20 or an updated SCPTM Configuration message, the one message comprising one or more parameters for at least one of the one or more MBMS services. According to an embodiment, the second base station may transmit to at least one first wireless device, MBMS transport blocks for the one or more MBMS services based on the one or more MBMS configuration parameters. According to an embodiment, the first base station may transmit to the second base station, a handover request message for a wireless device based at least on the one or more MBMS configuration parameters.

FIG. 18 is an example flow diagram as per an aspect of an embodiment of the present disclosure. At 1810, a first base station may transmit to a second base station, an eNB configuration update message comprising one or more multimedia broadcast multicast service (MBMS) configuration parameters employed by a first cell of the first base station. The one or more MBMS configuration parameters may comprise: at least one temporary mobile group identity (TMGI) of at least one MBMS service; a first discontinuous reception inactivity timer; and a first scheduling period start offset. At 1820, the first base station may receive from the second base station, in response to the eNB configuration update message, an eNB configuration update acknowledge message indicating an acknowledgement of an MBMS configuration update based on the one or more MBMS configuration parameters. At 1830, the first base station may transmit to at least one wireless device, the first discontinuous reception inactivity timer and the first scheduling period start offset. At 1840, the first base station may transmit to the at least one wireless device, MBMS transport blocks for the at least one MBMS service based on the first discontinuous reception inactivity timer and the first scheduling period start offset.

According to an embodiment, the one or more MBMS configuration parameters may further comprise at least one of: an MBMS session identifier; a group-radio network temporary identifier (G-RNTI) parameter; single cell multicast traffic channel (SC-MTCH) scheduling parameters comprising an on-duration timer single cell point to multipoint (SCPTM); a cell identifier of an SC-MTCH neighbor cell providing at least one of the one or more MBMS services via an SC-MTCH; a radio frame allocation period; a radio frame allocation offset; or one or more subframe allocation parameters. According to an embodiment, the eNB configuration update message may further comprise at least one of: an MBMS frequency; an MBMS session identifier; a group-radio network temporary identifier (G-RNTI) of an MBMS service or a vehicle-to-everything (V2X) service; a destination layer-2 identifier for an MBMS service or a V2X service; an MBMS service priority; or a V2X service priority.

According to an embodiment, the second base station may determine a second discontinuous reception inactivity timer and a second scheduling period start offset for the at least one MBMS service of the at least one TMGI. The determination may be based on the first discontinuous reception inactivity timer and the first scheduling period start offset. According to an embodiment, the second base station may transmit to at least one wireless device, the second discontinuous reception inactivity timer and the second scheduling period start offset. According to an embodiment, the second base station may transmit to the at least one wireless device, MBMS transport blocks for the at least one MBMS service based on the second discontinuous reception inactivity timer and the second scheduling period start offset. According to an embodiment, the first base station may transmit one message of an updated SIB20 or an updated SCPTM Configuration message. The one message may comprise one or more parameters for at least one of the one or more MBMS services. According to an embodiment, the first base station may receive from the second base station, a handover request message for a wireless device based at least on the one or more MBMS configuration parameters.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on mission critical services such as mission critical push-to-talk services employing media types such as audio services, video services and media services. However, one skilled in the art will recognize that embodiments of the invention may also be implemented in a system comprising other types of services such as, for example, data services, augmented reality services, data fusion services, combinations thereof, and/or the like.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A system comprising:
a second base station; and
a first base station comprising:
one or more processors; and
memory storing instructions that, when executed by the one or more processors, cause the first base station to:
receive, configuration parameters employed by the second base station for at least one broadcast multicast service, the configuration parameters comprising:
a first scheduling period start offset; and
first single cell multicast traffic channel (SC-MTCH) scheduling parameters comprising an on-duration timer value for single cell point to multipoint (SCPTM);
determine, based on the configuration parameters, a second scheduling period start offset and second SC-MTCH scheduling parameters; and
transmit, to at least one wireless device, first transport blocks for the at least one broadcast multicast service based on the second scheduling period start offset and the second SC-MTCH scheduling parameters.

2. The system of claim 1, wherein the instructions, when executed by the one or more processors, further cause the first base station to transmit, by the first base station to the second base station in response to receiving the configuration parameters, a configuration update acknowledge message indicating an acknowledgement of a broadcast multicast service configuration update based on the configuration parameters.

3. The system of claim 1, wherein the instructions, when executed by the one or more processors, further cause the first base station to transmit, by the first base station, one message of an updated SIB20 or an updated single cell point to multipoint (SCPTM) Configuration message, the one message comprising one or more parameters for the at least one multicast broadcast service.

4. The system of claim 1, wherein the second base station transmits to the at least one wireless device, second transport blocks for the at least one multicast broadcast service based on the configuration parameters.

5. The system of claim 1, wherein the instructions, when executed by the one or more processors, further cause the first base station to transmit, by the first base station to the second base station, a handover request message for the at least one wireless device based at least on the configuration parameters.

6. The system of claim 1, wherein the configuration parameters further comprise at least one of:
a broadcast multicast service session identifier;
a group-radio network temporary identifier (G-RNTI) parameter;
a first discontinuous reception inactivity timer value; or
a cell identifier of an SC-MTCH neighbor cell providing the at least one broadcast multicast service via an SC-MTCH.

7. The system of claim 1, wherein the configuration parameters further comprise at least one of:
a radio frame allocation period;
a radio frame allocation offset; or
one or more subframe allocation parameters.

8. The system of claim 1, wherein the instructions, when executed by the one or more processors, further cause the first base station to receive at least one of:

a broadcast multicast service frequency;
a broadcast multicast session identifier; or
a group-radio network temporary identifier (G-RNTI) of the broadcast multicast service.

9. The system of claim 1, wherein the instructions, when executed by the one or more processors, further cause the first base station to receive at least one of:
a destination layer-2 identifier for the broadcast multicast service;
a broadcast multicast service priority; or
a vehicle-to-everything (V2X) service priority.

10. A system comprising:
a second base station; and
a first base station comprising:
one or more processors;
memory storing instructions that, when executed by the one or more processors, cause the first base station to:
receive configuration parameters employed by the second base station for at least one broadcast multicast service, the configuration parameters comprising:
a first discontinuous reception inactivity timer value; and
a first scheduling period start offset;
determine, based on the configuration parameters, a second discontinuous reception inactivity timer value and a second scheduling period start offset; and
transmit, to at least one wireless device, first transport blocks for the at least one broadcast multicast service based on the second discontinuous reception inactivity timer value and the second scheduling period start offset.

11. The system of claim 10, wherein the configuration parameters further comprise at least one of:
a broadcast multicast service session identifier;
a group-radio network temporary identifier (G-RNTI) parameter;
single cell multicast traffic channel (SC-MTCH) scheduling parameters comprising an on-duration timer single cell point to multipoint (SCPTM); or
a cell identifier of an SC-MTCH neighbor cell providing the at least one broadcast multicast service via an SC-MTCH.

12. The system of claim 10, wherein the configuration parameters further comprise at least one of:
a radio frame allocation period;
a radio frame allocation offset; or
one or more subframe allocation parameters.

13. The system of claim 10, wherein the instructions, when executed by the one or more processors, further cause the first base station to receive at least one of:
a broadcast multicast service frequency;
a broadcast multicast session identifier; or
a group-radio network temporary identifier (G-RNTI) of the broadcast multicast service.

14. The system of claim 10, wherein the instructions, when executed by the one or more processors, further cause the first base station to receive at least one of:
a destination layer-2 identifier for the broadcast multicast service;
a broadcast multicast service priority; or
a vehicle-to-everything (V2X) service priority.

15. The system of claim 10, wherein the instructions, when executed by the one or more processors, further cause the first base station to transmit, to the second base station in response to receiving the configuration parameters, a configuration update acknowledge message indicating an acknowledgement of a broadcast multicast service configuration update based on the configuration parameters.

16. The system of claim 10, wherein the instructions, when executed by the one or more processors, further cause the first base station to transmit one message of an updated SIB20 or an updated single cell point to multipoint (SCPTM) Configuration message, the one message comprising one or more parameters for the at least one multicast broadcast service.

17. The system of claim 10, wherein the second base station transmits to the at least one wireless device, second transport blocks for the at least one multicast broadcast service based on the configuration parameters.

18. The system of claim 10, wherein the instructions, when executed by the one or more processors, further cause the first base station to transmit, to the second base station, a handover request message for the at least one wireless device based at least on the configuration parameters.

* * * * *